United States Patent [19]
Mizuno et al.

[11] Patent Number: 5,901,280
[45] Date of Patent: May 4, 1999

[54] TRANSMISSION MONITORING AND CONTROLLING APPARATUS AND A TRANSMISSION MONITORING AND CONTROLLING METHOD

[75] Inventors: Masahiro Mizuno; Hiroshi Baba; Hitoshi Yamamoto, all of Tokyo, Japan

[73] Assignee: Mitsubishi Denki Kabushiki Kaisha, Tokyo, Japan

[21] Appl. No.: 08/808,968

[22] Filed: Feb. 19, 1997

[30] Foreign Application Priority Data

Sep. 12, 1996 [JP] Japan .................................. 8-241994

[51] Int. Cl.⁶ ...................................................... G06F 11/00
[52] U.S. Cl. ...................................................... 395/182.04
[58] Field of Search ........................ 395/182.04, 182.02, 395/182.03, 182.13, 183.01, 183.15, 183.18, 184.01, 200.11–21, 441, 182.06, 182.11, 183.07, 183.19; 371/37.7, 40.15; 364/550

[56] References Cited

U.S. PATENT DOCUMENTS

| | | | |
|---|---|---|---|
| 4,713,811 | 12/1987 | Frey | 371/9 |
| 5,367,669 | 11/1994 | Holland et al. | 395/575 |
| 5,608,891 | 3/1997 | Mizuno et al. | 395/441 |
| 5,638,518 | 6/1997 | Malladi | 395/200.21 |
| 5,664,220 | 9/1997 | Itoh et al. | 395/826 |
| 5,675,723 | 10/1997 | Ekrot et al. | 395/182.02 |
| 5,706,210 | 1/1998 | Kumano et al. | 364/514 C |
| 5,734,814 | 3/1998 | Corbin et al. | 395/182.04 |

FOREIGN PATENT DOCUMENTS

| | | |
|---|---|---|
| 0221275 | 5/1987 | European Pat. Off. . |
| 2302428 | 1/1997 | United Kingdom . |
| 9108535 | 6/1991 | WIPO . |

*Primary Examiner*—Robert W. Beausoliel, Jr.
*Assistant Examiner*—Nadeem Iqbal
*Attorney, Agent, or Firm*—Leydig, Voit & Mayer

[57] ABSTRACT

A transmission monitoring and controlling apparatus is provided between a first system and a second system. The transmission monitoring and controlling apparatus monitors information transmitted through a Fibre Channel. Then, a back controller analyzes the monitored information and stores the information in a controlling memory based on the analysis. For example, when the first system writes data on the second system, the back controller stores the data in the controlling memory. Therefore, even if a failure has occurred in the second system, the transmission monitoring and controlling apparatus is able to read the data from the controlling memory and send the data to the first system instead of to the second system.

21 Claims, 18 Drawing Sheets

Fig.8

| DISK NUMBER | LOGICAL BLOCK ADDRESS | DATA |
|---|---|---|
| #10 | 100 | XXYYZZ |
| #10 | 105 | AABBCC |
| #10 | 110 | PPQQRR |
| ------ | ------ | ------ |

Fig.10

| FLAG | DISK NUMBER | LOGICAL BLOCK ADDRESS | STORED ADDRESS |
|---|---|---|---|
| 0 | #9 | 100 | 0 |
| 0 | #8 | 105 | 3 |
| 0 | #9 | 110 | 5 |
| 0 | #8 | 100 | 2 |
| ------ | ------ | ------ | ------ |

FLAG "0" → REDUNDANT DATA ARE NOT UPDATED.
FLAG "1" → REDUNDANT DATA ARE UPDATED.

Fig. 13

| FLAG | FLAG TO WRITE DATA | DISK NUMBER | LOGICAL BLOCK ADDRESS | STORED ADDRESS | DATA |
|---|---|---|---|---|---|
| 0 | 0 | #9 | 100 | 0 | 1A |
| 0 | 0 | #8 | 105 | 3 | 2A |
| 0 | 0 | #9 | 110 | 5 | 3A |
| 0 | 0 | #8 | 100 | 2 | 4A |
| ------ | ------ | ------ | ------ | ------ | ------ |

FLAG "0" → REDUNDANT DATA ARE NOT UPDATED.
FLAG "1" → REDUNDANT DATA ARE UPDATED.
FLAG TO WRITE DATA "0" → DATA ARE NOT WRITTEN ON MAGNETIC DISK.
FLAG TO WRITE DATA "1" → DATA ARE WRITTEN ON MAGNETIC DISK.

TRANSMISSION MONITORING AND CONTROLLING APPARATUS AND A TRANSMISSION MONITORING AND CONTROLLING METHOD

BACKGROUND OF THE INVENTION

1. Field of the Invention

This invention relates to monitoring and controlling operations in a network. Particularly, this invention relates to a transmission monitoring and controlling apparatus which monitors information in a network connecting a first system and a second system, analyzes the monitored information, and controls at least one of the operation of the first system and the operation of the second system based on the analysis. This invention also relates to a transmission monitoring and controlling method.

2. Description of the Related Art

According to the related art, a transmission monitor, which monitors information in a network connecting a first system and a second system, monitors conditions of the network, the first system and the second system. When one of the network, the first system and the second system is in an abnormal condition, the transmission monitor reports the abnormal condition.

FIG. 18 is a configuration chart of a network to which the transmission monitor according to the related art is connected.

In FIG. 18, a first system 100, which is a host computer (or a server), is connected to second systems 103–107, which are clients 1–5, via a network 102.

Further, a transmission monitor 101 is connected to the network 102 which connects the first system 100 and the second systems 103–107. The transmission monitor 101 includes a display panel 101a and a buzzer 101b which report an abnormal condition.

The transmission monitor 101 monitors information which is transmitted in the network 102, and monitors conditions of the first system 100, the second systems 103–107, and the network 102. When the transmission monitor 101 detects information indicating an abnormal condition, the transmission monitor 101 displays the location of the abnormal condition on the display panel 101a, and alerts an operator, who monitors the network with the buzzer 101b.

For example, as illustrated in FIG. 18, when a failure has occurred in the network 102 connecting the second system 104, i.e., client 2, the transmission monitor 101 displays a network configuration chart on the display panel 101a, and turns a light on and off at the location of the failure. At the same time, the transmission monitor 101 sounds the buzzer 101b. When the operator hears the buzzer, the operator recognizes that a failure has occurred. Then, the operator recognizes the location of the failure by referring to the display panel 101a, and takes some action to recover from the failure.

As stated, the transmission monitor according to the related art monitors the first system, the second system, and the network. When an abnormal condition has occurred in the first system, the second system, or the network, the transmission monitor only reports the abnormal condition to an operator, and the transmission monitor does not take any measures to recover from the abnormal condition.

Therefore, when the transmission monitor according to the related art is used in a system, an operator has to be constantly working to perform a recovery operation in case of a failure.

Besides, measures to lighten the load of the network are not provided in the transmission monitor according to the related art.

SUMMARY OF THE INVENTION

This invention provides a transmission monitoring and controlling apparatus and a transmission monitoring and controlling method recognizing an abnormal condition in a system and automatically performs a recovery operation from the abnormal condition. Further, this invention lightens the load on transmission lines.

According to one aspect of this invention, a transmission monitoring and controlling apparatus for monitoring and controlling a network connecting a first system and a second system includes a monitor for monitoring information transmitted in a network, a back controller for generating information sent to the network in response to information detected by the monitor, and a switch receiving the information generated by the back controller and information transmitted in the network for switching to output to the network one of the information transmitted and the information generated.

According to another aspect of this invention, a transmission monitoring and controlling method, in which a network connecting a first system and a second system is monitored and controlled, includes steps of monitoring information transmitted in the network, receiving the information monitored, generating information based on the information received, and sending to the network the information generated based on the received information, and switching so that one of the information generated based on the received information generating and the information transmitted in the network is outputted to the network.

Other objects features, and advantages of the invention will be apparent from the following description when taken in conjunction with the accompany drawings.

BRIEF DESCRIPTION OF FIGURES

In the drawings.

FIG. 8 shows a sample of information stored in the memory 5 or the magnetic disk 6 of FIG. 1;

FIG. 10 shows a sample of the redundant data and the location information for writing which are stored in the transmission monitoring and controlling apparatus of embodiment 3;

FIG. 13 shows a sample of the redundant data updating information and location information for writing which are stored in the transmission monitoring and controlling apparatus of embodiment 4;

DESCRIPTION OF THE PREFERRED EMBODIMENTS

Embodiment 1

In embodiment 1, an optical fiber cable is used in a network for connecting a first system and a second system. Particularly, a Fibre Channel is used in embodiment 1. Fibre Channel is a general term of a new standard which is developed by American National Standards Institute (ANSI). Fibre Channel is a kind of optical LAN (Local Area Network) employing serial interfaces. The other serial interfaces such as SSA (Servial Storage Architecture), P1394, etc. may be used instead of Fibre Channel.

A transmission monitoring and controlling apparatus and a transmission monitoring and controlling method according to this invention are explained in reference to the figures.

Figure 1:
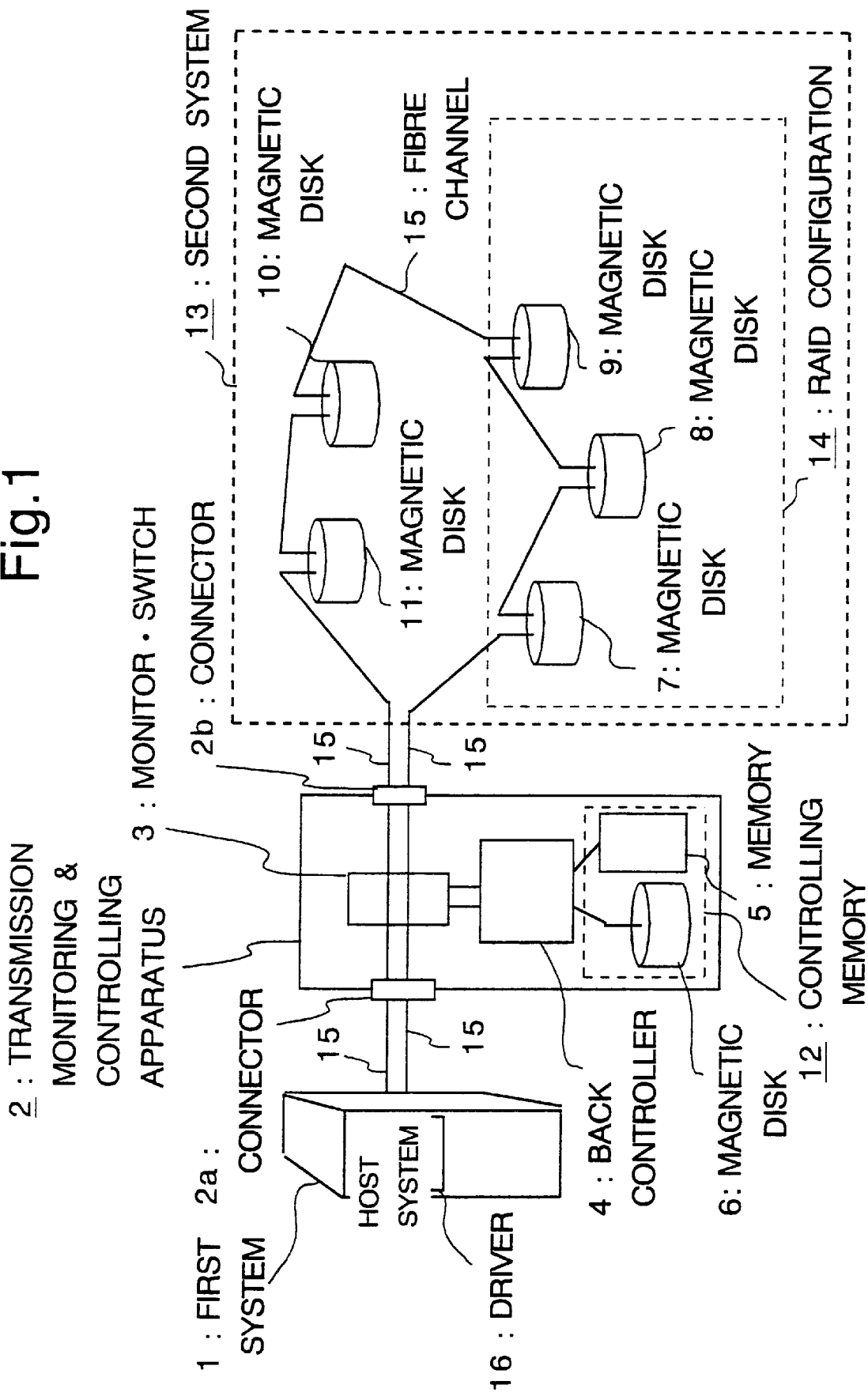
FIG. 1 is a configuration chart of a network system including the transmission monitoring and controlling apparatus of embodiment 1.

FIG. 1 is a system configuration chart of a network system which includes the transmission monitoring and controlling apparatus of embodiment 1.

In FIG. 1, a first system 1, which is a host system, is connected to a second system 13 via Fibre Channel 15. The second system 13 is a system in which magnetic disks 7, 8, 9, 10, and 11 are connected in a loop through Fibre Channel. The magnetic disks 7, 8, and 9 have a RAID (Redundant Array of Inexpensive Disks) configuration 14 as a data memory. Operation of the RAID configuration 14 is controlled by a driver 16 in the first system.

Further, a transmission monitoring and controlling apparatus 2 is provided between the first system 1 and the second system 13. The transmission monitoring and controlling apparatus 2 monitors information which is transmitted through Fibre Channel 15, and controls the first system 1 or the second system 13 based on the monitoring result. The transmission monitoring and controlling apparatus 2 includes a connector 2a on a side of the first system 1 and a connector 2b on a side of the second system 13, each of which is connected to Fibre Channel 15.

The transmission monitoring and controlling apparatus 2 includes a monitor • switch 3, a back controller 4 and a controlling memory 12. The back controller 4 generates a command for the first system 1 and the second system 13 to perform a predetermined operation. Details are described later.

The monitor • switch 3 monitors information which is transmitted through Fibre Channel 15. The monitor • switch 3 receives the information which is transmitted through Fibre Channel 15, and outputs the received information thoroughly. The monitor • switch 3 receives a command which is generated by the back controller 4, and switches so that the command does not conflict with other information which is transmitted through Fibre Channel 15. Then, the monitor • switch 3 sends the command to the first system 1 and the second system 13.

The controlling memory 12 includes a memory 5 and a magnetic disk 6. The controlling memory 12 stores data to be written in the second system 13 redundantly, for example. The controlling memory 12 also stores location information for writing data on the magnetic disks 7–11 and information for updating redundant data in the RAID configuration 14.

Figure 2:
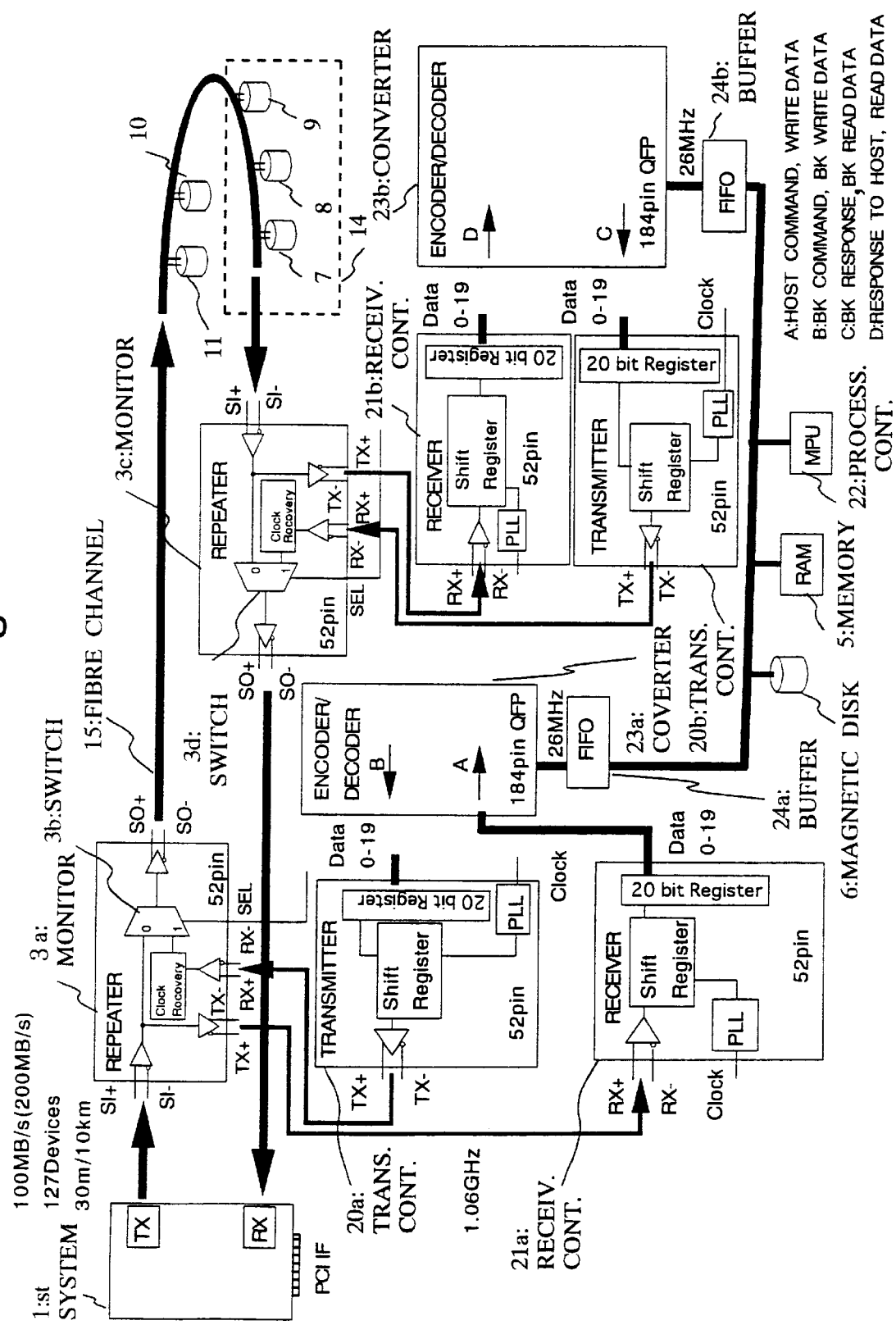
FIG. 2 is a detailed explanatory chart of the transmission monitoring and controlling apparatus illustrated in FIG. 1.

FIG. 2 is detailed configuration chart of the transmission monitoring and controlling apparatus of FIG. 1.

In FIG. 2, the first system 1 includes a transmitter (TX) for sending information to Fibre Channel 15 and a receiver (RX) for receiving information from Fibre Channel 15. One end of Fibre Channel 15 is connected to the transmitter and the other end of Fibre Channel 15 is connected to the receiver, i.e., Fibre Channel 15 is connected to the first system 1 in a loop.

Besides, the magnetic disks 7–11 are connected to the first system 1 via the transmission monitoring and controlling apparatus and Fibre Channel 15. Further, the monitor • switch 3 includes a monitor 3a, a switch 3b, a monitor 3c, and a switch 3d. The monitor 3a monitors the information which is outputted from the transmitter (TX), and the monitor 3c monitors information which is outputted from the second system 13.

The back controller 4 includes a transmitting controller 20a, a receiving controller 21a, a converter 23a, a buffer 24a, a processing controller 22, a transmitting controller 20b, a receiving controller 21b, a converter 23b, and a buffer 24b.

The receiving controller 21a receives the information which is monitored by the monitor 3a, and sends the information to the converter 23a. The receiving controller 21b also receives the information which is monitored by the monitor 3c, and sends the information to the converter 23b. Since the information which is transmitted through Fibre Channel 15 has a unit of ten bits, the converters 23a and 23b convert the information which is transmitted from the receiving controllers 21a and 21b to a unit of eight bits, and sends the converted information to the processing controller 22.

The processing controller 22 analyzes the information which is sent from the converters 23a and 23b, and stores the information in the magnetic disk 6 and the memory 5 based on the analysis. The processing controller 22 also generates information, e.g., a command, for the first system 1 and the second system 13 to perform a predetermined operation. Details are described later.

A command which is generated by the processing controller 22 is converted from eight bits to ten bits by the converter 23a or 23b, and sent to the transmitting controller 20a or 20b. Then, the information is sent from the transmitting controller 20a to the monitor 3a.

The monitor 3a receives the information from the transmitting controller 20a and the information which is outputted from the first system 1, and the switch 3b controls sending of the information from the first system 1 to Fibre Channel 15 with a priority.

The transmitting controller 20b sends the received information to the monitor 3c. The monitor 3c receives the information from the transmitting controller 20b and the information from the second system 13, and the switch 3d controls sending of the information from the second system 13 to Fibre Channel 15 with a priority.

Owing to the operations of the switches 3b and 3d, the operation of the transmission monitoring and controlling apparatus 2 does not influence Fibre Channel 15. The operation of the transmission monitoring and controlling apparatus 2 is not related to Fibre Channel 15.

The transmission rate of the information from the converters 23a and 23b to the processing controller 22 differs from the processing rate of the information received by the processing controller 22. Therefore, the buffers 24a and 24b absorb the rate difference.

As stated, the transmission monitoring and controlling apparatus 2 includes two sets of the monitor, the switch, the receiving controller, the transmitting controller, the converter, and the buffer.

Figure 3:
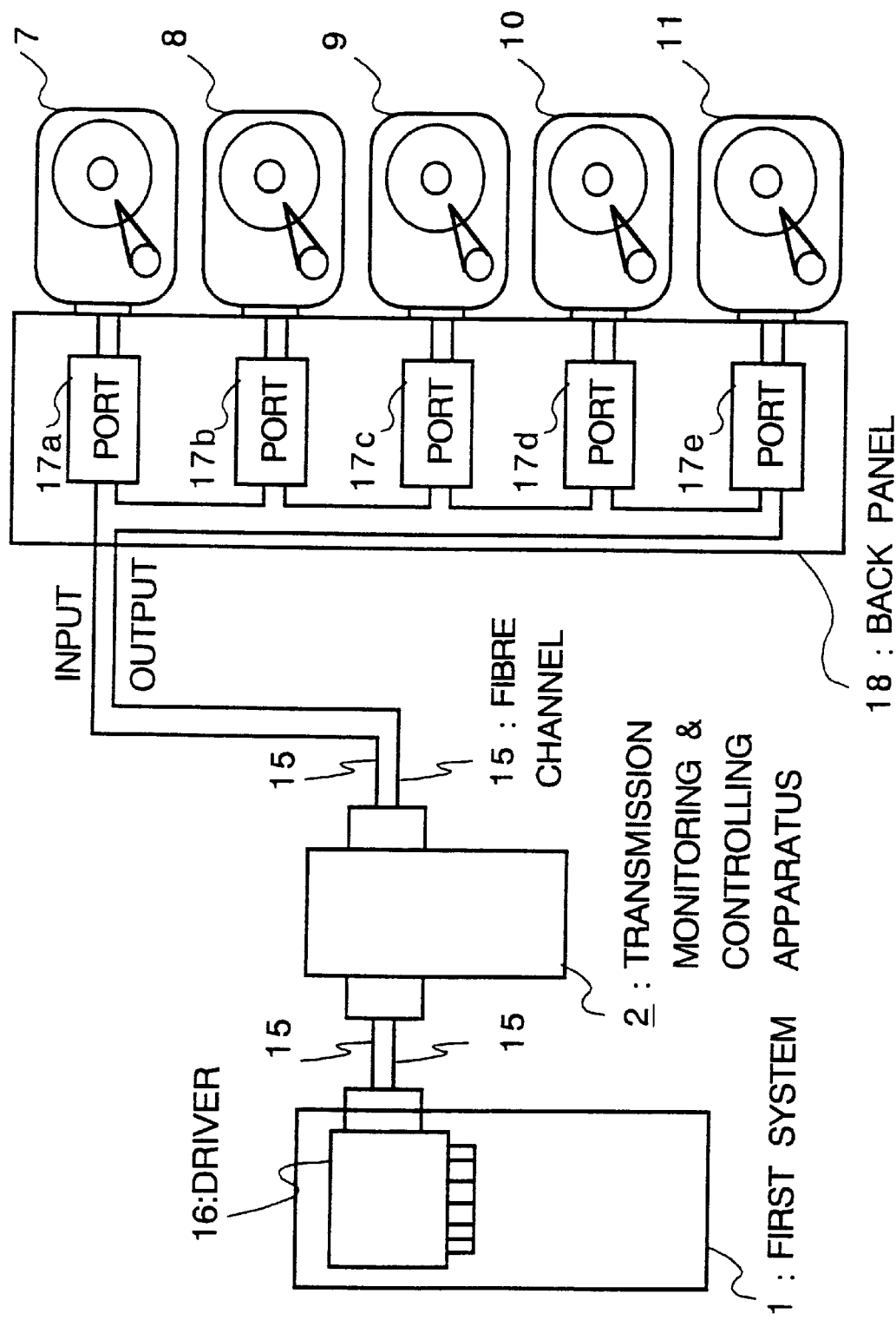
FIG. 3 is a configuration chart of a connection of the magnetic disks 7–11 of FIG. 1.

FIG. 3 is a configuration chart of a connection of the magnetic disks 7–11 of FIG. 1.

The magnetic disks 7–11 are packaged on a chassis which is not illustrated in FIG. 3. The magnetic disks 7–11 are connected to ports 17a–17e on a back panel of the chassis. An input of Fibre Channel 15 is directly connected to the port 17a, and the port 17a is connected serially to the port 17e through connection lines on the back panel 18. An output side of Fibre Channel 15 is directly connected to the port 17e. The magnetic disks 7–9 have the RAID (Redundant Array of Inexpensive Disks) configuration. A striping operation is performed by the driver 16.

Figure 4:
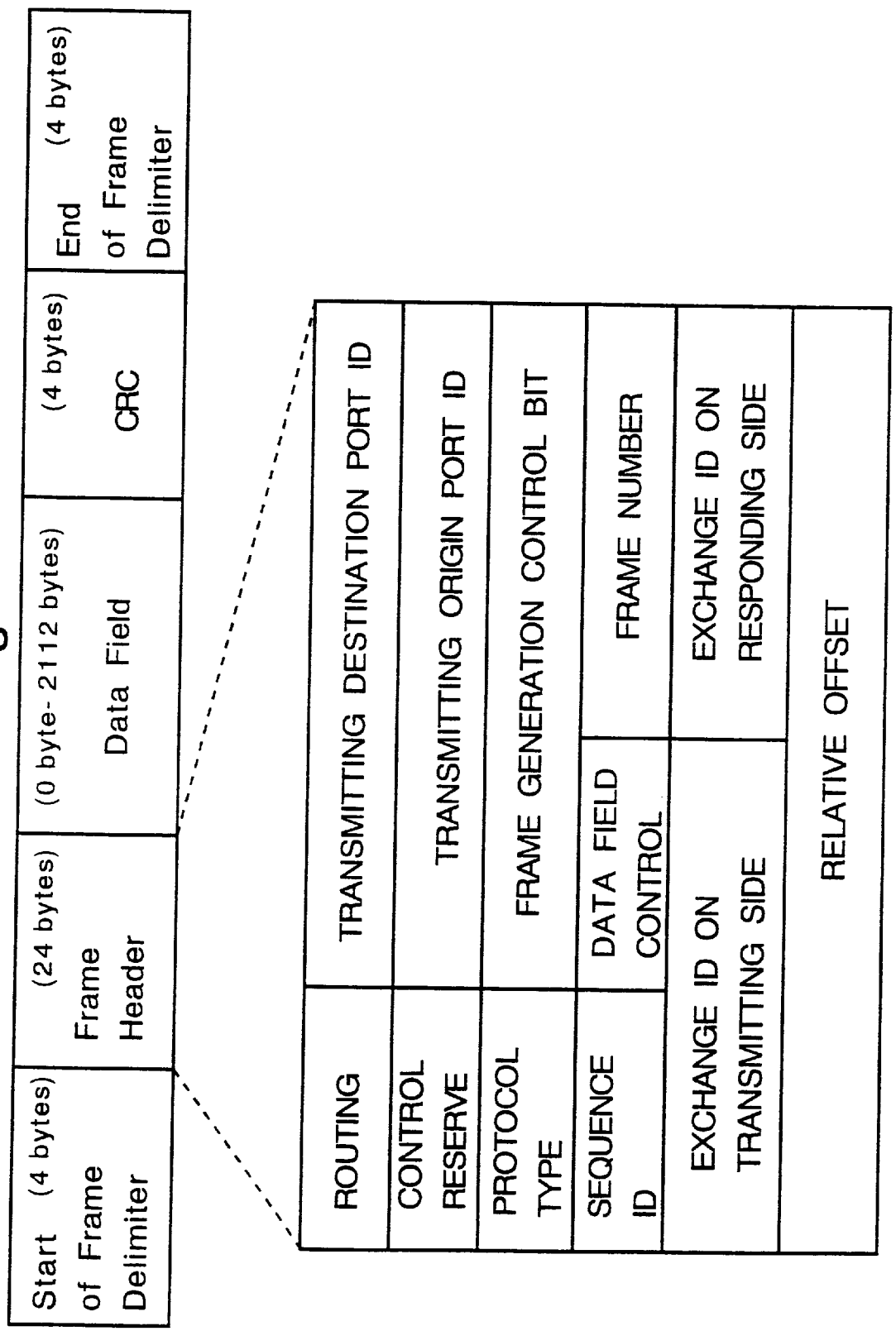
FIG. 4 illustrates a configuration of information transmitted through a Fibre Channel according to the invention.

FIG. 4 illustrates the configuration of information which is transmitted through Fibre Channel 15.

A packet, as illustrated in FIG. 4, is transmitted through Fibre Channel 15. In FIG. 4, the packet includes information of a start of a frame delimiter of 4 bytes, information of a frame header of 24 bytes, a data field of 0–2112 bytes, a CRC (Cyclic Redundancy Check) of 4 bytes, and information of an end of a frame delimiter of 4 bytes.

The information of the frame header includes routing data, a transmission destination port ID, control reserve, a transmission origin port ID, a protocol type, a frame generation control bit, a sequence ID, data field control, a frame number, an exchange ID on a transmitting side, an exchange ID on a responding side, and a relative offset.

Figure 5:
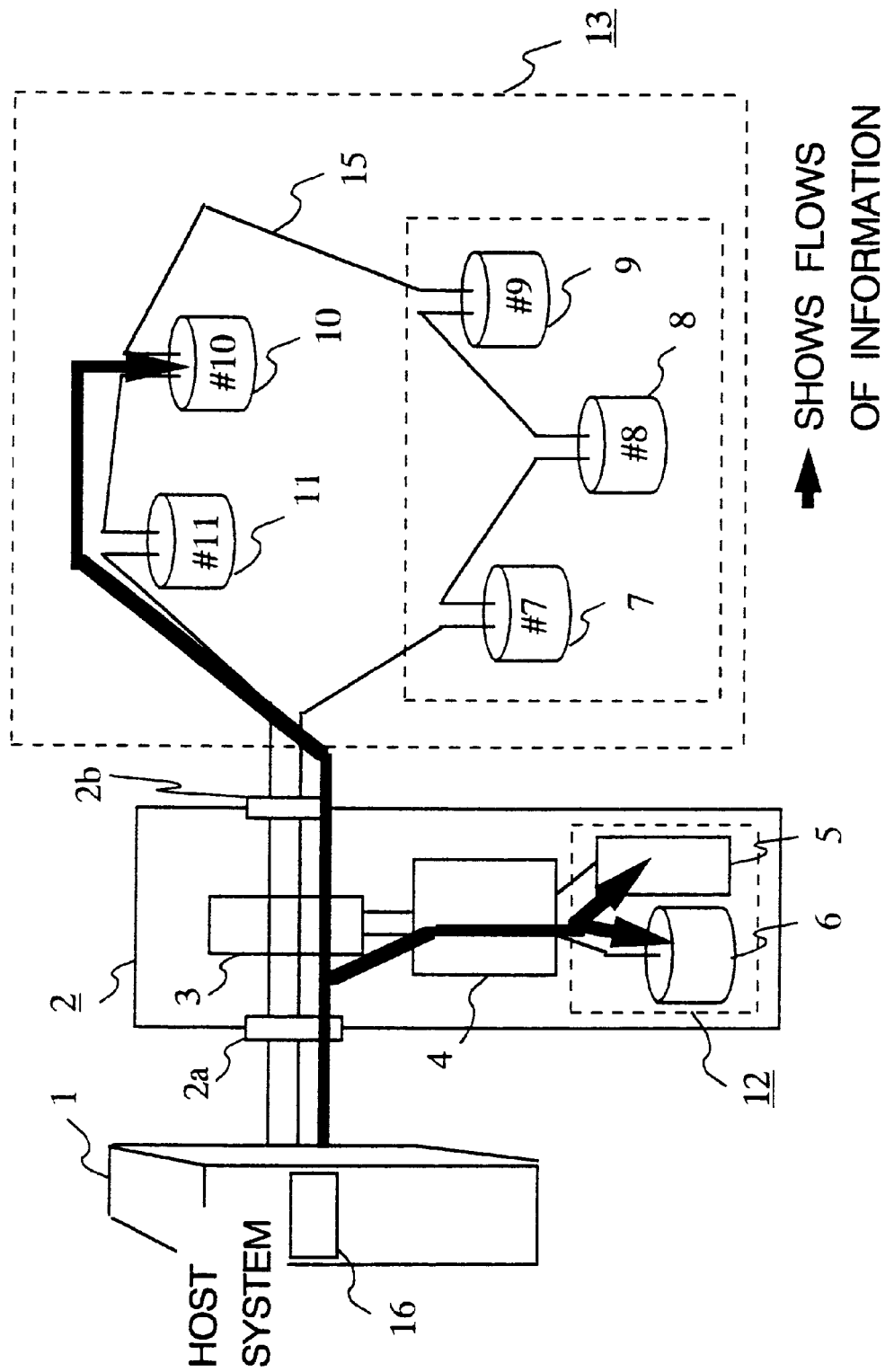
FIG. 5 is an explanatory chart of an operation of the transmission monitoring and controlling apparatus of embodiment 1.

FIG. 5 illustrates operation of the transmission monitoring and controlling apparatus of embodiment 1.

The configuration of the system which includes the transmission monitoring and controlling apparatus 2 in FIG. 5 is same as the configuration of FIG. 1. Therefore, an explanation of the reference numbers in FIG. 5 is omitted.

In FIG. 5, the first system 1, which is the host system, outputs a command to write data on the magnetic disk 10 in the second system 13 using the data field of the packet. The transmission monitoring and controlling apparatus 2 monitors the command to write from the first system 1 with the monitor 3a. The information which is monitored by the monitor 3a is analyzed by the back controller 4. The back controller 4 stores data to be written on the magnetic disk 10 also in the memory 5 or the magnetic disk 6 in order to store the data redundantly.

Figure 6:
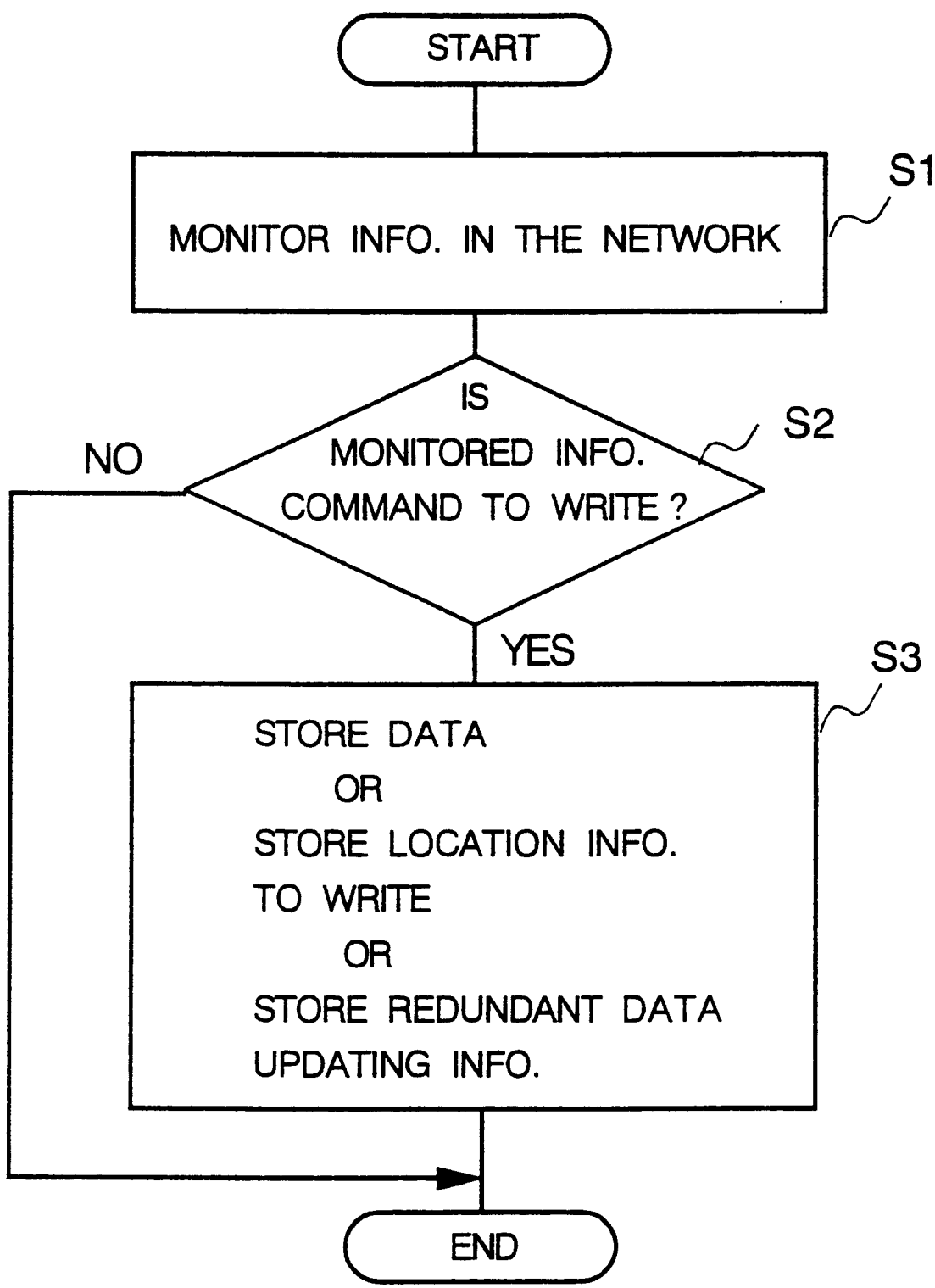
FIG. 6 is a flow chart of a transmission monitoring and controlling method according to the invention.
Figure 7:
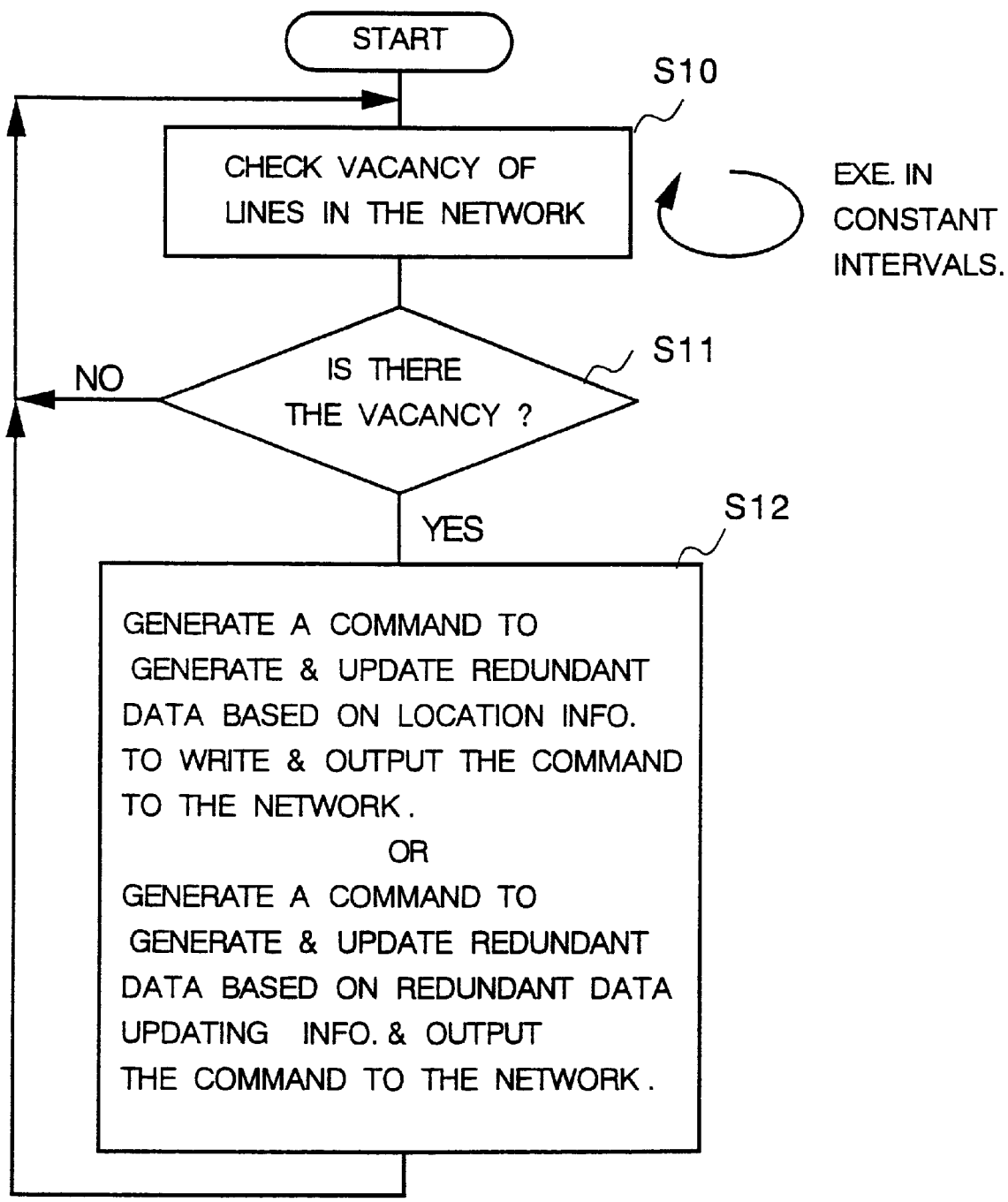
FIG. 7 is a flow chart of a transmission monitoring and controlling method according to the invention.

FIGS. 6 and 7 explain a transmission monitoring and controlling method of this invention.

FIG. 8 shows an sample of information which is stored in the magnetic disk or the memory.

In reference with flow charts of FIGS. 6 and 7, an operation of the transmission monitoring and controlling apparatus 2 in FIG. 5 is explained. Hereinafter, the transmission monitoring and controlling apparatus 2 is assumed to be configured as illustrated in FIG. 2.

In FIG. 6, the transmission monitoring and controlling apparatus 2 monitors information which is transmitted in the network using the monitor 3a or 3c (step S1). The information which is transmitted in the network includes information which is sent from the first system 1 to the second system 13 and information which is sent from the second system 13 to the first system 1. For example, in FIG. 5, the first system 1 outputs a command to write data on the magnetic disk 10 using the data field of the packet. Therefore, the monitor 3a monitors the command to write data on the magnetic disk 10. The monitor 3a only monitors the command to write. Therefore, an operation writing data on the magnetic disk 10 is performed without intervention.

Then, the processing controller 22 determines whether the information which is monitored by the monitor 3a or 3c is a command to write (step S2).

If the processing controller 22 determines that the monitored information is the command to write, the processing controller 22 stores data to be written on the magnetic disk 10 in the memory 5 or the magnetic disk 6. The processing controller 22 also stores location information to write on the magnetic disk 10. When the second system 13 includes a RAID configuration, and redundant data are stored, redundant data updating information which shows an updated condition of the redundant data is stored (step S3).

In the configuration of FIG. 5, data which are written on the magnetic disk 10 are stored redundantly. Therefore, the redundant data updating information is not stored. An operation storing the redundant data updating information is explained later.

FIG. 8 shows a sample of the data and the location information to be written which are stored in step S3.

For example, when the monitor 3a monitors a command to write data "XXYYZZ" at logical block address 100 on the magnetic disk 10, the processing controller 22 stores a disk number #10 of the magnetic disk 10, the logical block address 100 and the data "XXYYZZ" in the memory 5 or the magnetic disk 6. The processing controller 22 stores the information which is monitored by the monitor 3a in the memory 5 or the magnetic disk 6 as illustrated in FIG. 8.

When the transmission monitoring and controlling apparatus according to this invention detects a command to write, the writing operation proceeds without intervention and the same data are stored in the magnetic disk or a memory in the transmission monitoring and controlling apparatus. Accordingly, the data are stored redundantly.

Therefore, even if a failure occurs in the magnetic disk 10 and it becomes impossible to write data on the magnetic disk 10, the data are stored in the memory 5 or the magnetic disk 6.

When the magnetic disk 10 recovers, the transmission monitoring and controlling apparatus 2 writes the data which is stored in the memory 5 or the magnetic disk 6 on the magnetic disk 10 as shown in FIG. 7. Since the monitor 3c monitors a message which is outputted from the magnetic disk 10 and the processing controller 22 analyzes the monitored information, the transmission monitoring and controlling apparatus 2 is able to determine that the magnetic disk 10 has recovered. The transmission monitoring and controlling apparatus 2 checks the vacancy of lines in the network in predetermined constant intervals (step S10).

This operation of checking vacancy is performed by the processing controller 22.

When it is determined that there is a vacancy in the lines (step S11), the processing controller 22 retrieves the data and the location information to write the data from the memory 5 or the magnetic disk 6. The processing controller 22 generates a command to write the data based on the location information for writing (step S12).

The processing controller 22 outputs the generated command to Fibre Channel 15. Step S12 includes a process of generating and updating redundant data according to redundant data updating information. Processing of the redundant data is explained later for another embodiment of this invention.

In step S11, when lines are fully occupied, the processing controller 22 continues to check the vacancy of the network in the predetermined constant intervals.

When a failure has occurred in the magnetic disk 10 and the first system 1 executes a command to read from the magnetic disk 10, operations are performed as follows.

In the transmission monitoring and controlling apparatus 2, the monitor 3a monitors the command to read data from the magnetic disk 10. The processing controller 22 analyzes the monitored information and realizes that the information is a command to read from the magnetic disk which has failed. Then, the processing controller 22 retrieves the data from the memory 5 or the magnetic disk 6. The processing controller 22 generates a command to send the retrieved data back to the first system 1, and outputs the command to Fibre Channel 15. The processing controller 22 changes a transmission origin port ID of the retrieved data to an ID of the magnetic disk 10 and sends the data to the first system 1, as if the data were retrieved from the magnetic disk 10.

Even if a failure has occurred in the second system 13, since the data are stored redundantly in the memory 5 or the magnetic disk 6, the transmission monitoring and controlling apparatus 2 is able to send the data back to the first system 1.

A case in which a failure has occurred in the magnetic disk 10 is explained. If a failure has occurred in Fibre Channel 15 connected to the second system 13, the transmission monitoring and controlling apparatus 2 replaces the second system and writes or reads the data in response to a command from the first system 1.

Accordingly, in a network system which includes the transmission monitoring and controlling apparatus according to this invention, when a failure has occurred in the first system or the second system, backup of the system which has failed is easily performed.

Embodiment 2

In embodiment 1, the data are stored redundantly in the magnetic disk 10 in the second system 13 and the magnetic disk 6 or the memory 5 in the transmission monitoring and controlling apparatus 2.

For a purpose of explanation, the RAID level of the RAID configuration 14 is assumed to be 0 in embodiment 2. In embodiment 2, a case in which the data are stored redundantly in the magnetic disk 7 and the magnetic disk 8 is explained.

Figure 9:
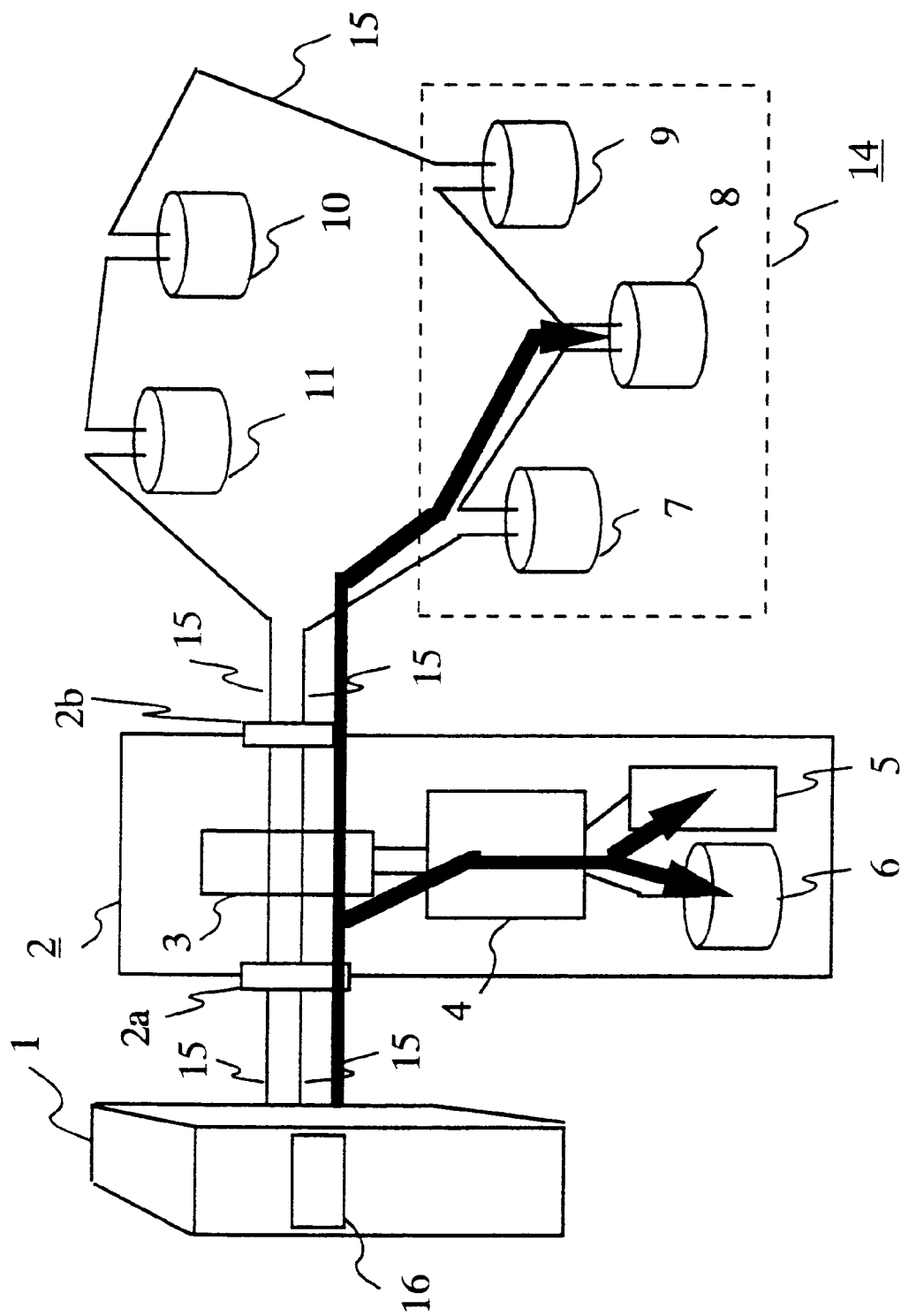
FIG. 9 illustrates an operation of the transmission monitoring and controlling apparatus of embodiment 2.

FIG. 9 illustrates operation of the transmission monitoring and controlling apparatus of embodiment 2.

In FIG. 9, the RAID configuration 14 has a RAID level of 0. Besides, the magnetic disks 7 and 8 are in the same configuration. However, when the first system 1 executes a command to write data in the RAID configuration 14, the data are written on the magnetic disk 8 but not on the magnetic disk 7. The data which are written on the magnetic disk 8 are also stored in the memory 5 or the magnetic disk 6 to store the data redundantly. When lines are open, the data which are stored in the memory 5 or the magnetic disk 6 are written back on the magnetic disk 7. Therefore, the driver 16 checks a response only from the magnetic disk 8, which is faster than checking responses from both of the magnetic disks 7 and 8. Hence, processing efficiency is improved.

For example, when the first system 1 executes a command to write data in the RAID configuration 14, the monitor 3a monitors the command to write and the processing controller 22 recognizes the monitored command to write. Then, the data are stored in the memory 5 or the magnetic disk 6. Location information for writing the data on the magnetic disk 8 is also stored. At this time, the command to write the data on the magnetic disk 8 is executed without any influence of the transmission monitoring and controlling apparatus 2. The processing controller 22 checks the vacancy of lines in predetermined constant intervals. When the processing controller 22 finds a vacancy in the lines, the processing controller 22 retrieves location information for writing from the memory 5 or the magnetic disk 6. The processing controller 22 generates a command to write the data on the magnetic disk 7 based on the location information for writing. Then, the processing controller 22 outputs the generated command to Fibre Channel 15.

Even when a failure has occurred in the magnetic disk 8, the transmission monitoring and controlling apparatus 2 stores the data and the location information for writing in the memory 5 or the magnetic disk 6 as if a failure had not occurred. When there is a vacancy in the lines, the transmission monitoring and controlling apparatus 2 generates a command to write the data on the magnetic disk 7, and outputs the generated command to Fibre Channel 15.

When the magnetic disk 8 has recovered from the failure, the transmission monitoring and controlling apparatus 2 also generates a command to write the data on the magnetic disk 8, and outputs the generated command to Fibre Channel 15.

In case the first system 1 attempts to execute a command to read data from the magnetic disk 8 which has failed, the transmission monitoring and controlling apparatus 2 retrieves the data from the memory 5 or the magnetic disk 6 instead of the magnetic disk 8 using the processing controller 22. Then, the transmission monitoring and controlling apparatus 2 generates a packet so that the first system 1 determines that the response is from the magnetic disk 8, and outputs the packet to Fibre Channel 15.

As in embodiment 1, in embodiment 2, the data are able to be stored redundantly in the memory and the magnetic disks in the transmission monitoring and controlling apparatus which includes the RAID configuration.

Embodiment 3

In embodiment 3, the RAID level of the RAID configuration 14 is assumed to be 4. When the first system 1 outputs a command to write data to the second system 13, the transmission monitoring and controlling apparatus operates as follows.

FIG. 10 shows a sample of the redundant data updating information and the location information for writing which are stored in the transmission monitoring and controlling apparatus of embodiment 3.

In FIG. 10, a flag of "0" indicates that redundant data in the RAID configuration 14 are not updated. A flag of "1" indicates that redundant data in the RAID configuration 14 are updated.

Figure 11:
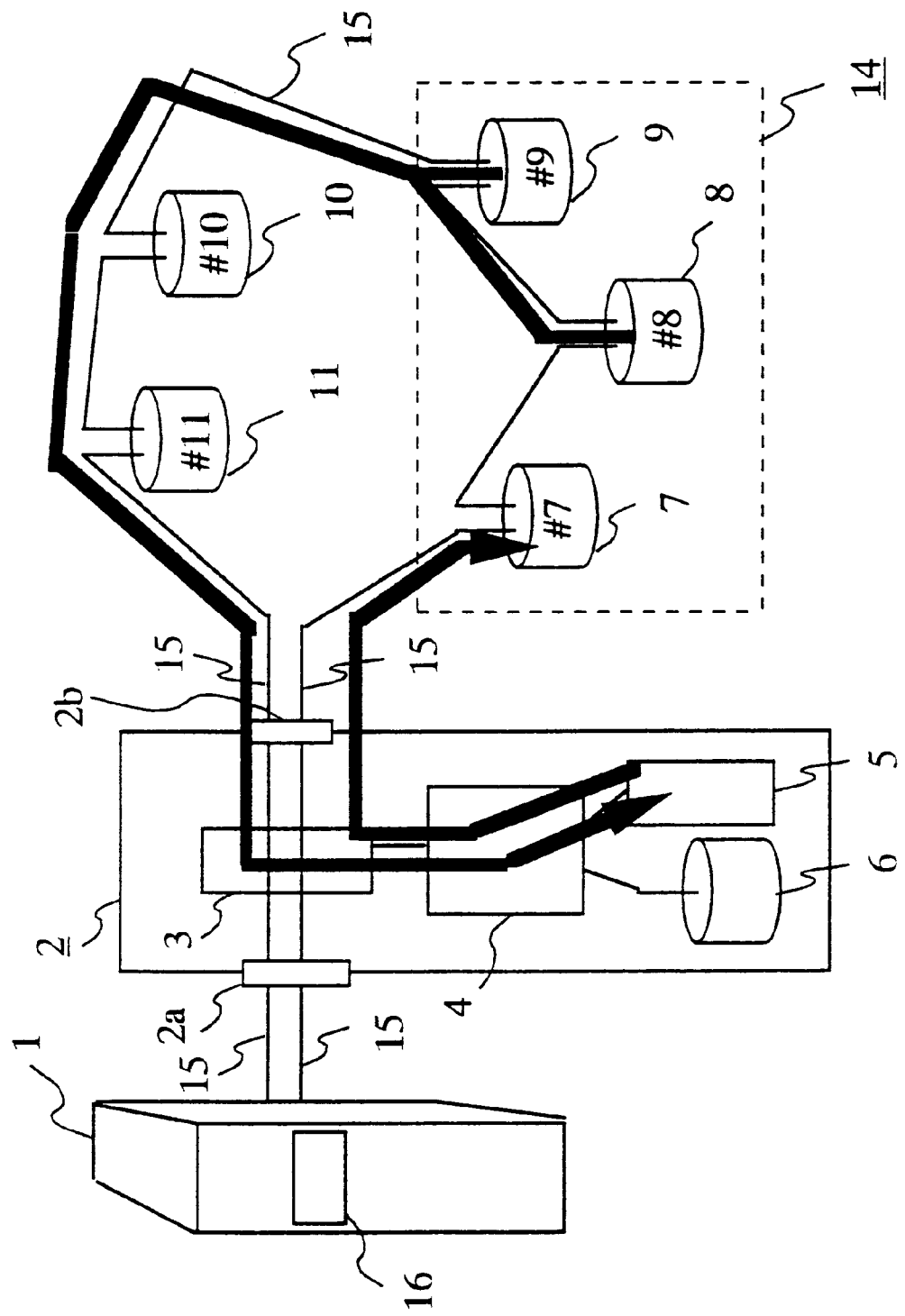
FIG. 11 illustrates an operation of the transmission monitoring and controlling apparatus of embodiment 3.

FIG. 11 illustrates an operation of the transmission monitoring and controlling apparatus of embodiment 3.

In embodiment 3, the RAID level of the RAID configuration 14 is assumed to be 4. Besides, the redundant data are assumed to be stored in the magnetic disk 7.

Figure 12:
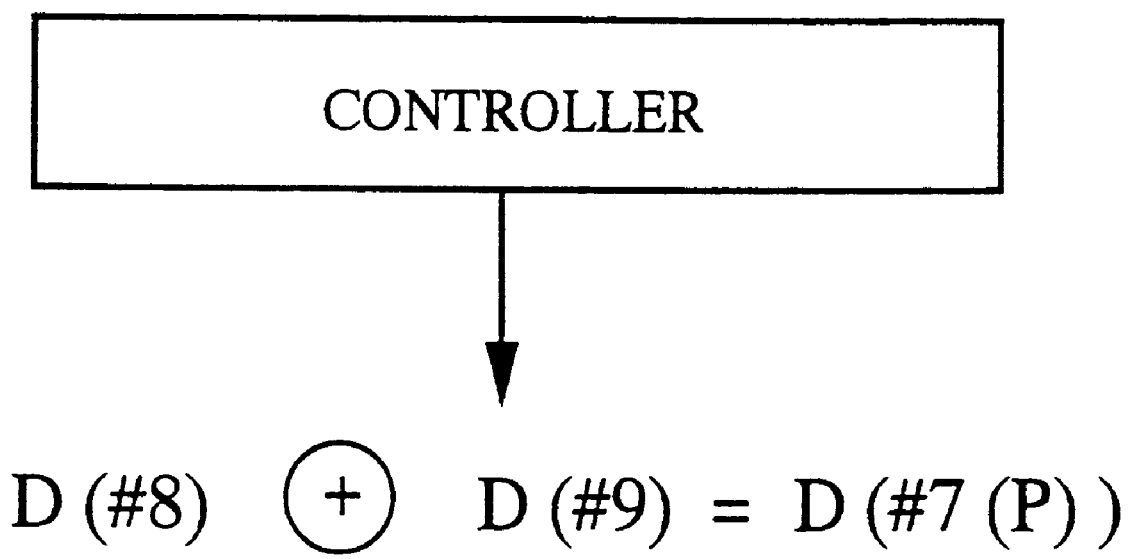
FIG. 12 shows a formula for generating the redundant data.

FIG. 12 shows a formula for generating redundant data. In FIG. 12, the redundant data which are stored in the magnetic disk 7 are obtained by an exclusive OR operation on the data which are stored in the magnetic disk 8 and the data which are stored in the magnetic disk 9.

Normally, when it is impossible to retrieve data from the particular magnetic disk because the magnetic disk or a network has failed, redundant data are used to regenerate necessary data. Therefore, in embodiment 3, when the redundant data are to be written on the magnetic disk 7, the redundant data are not updated. When lines are open, the transmission monitoring and controlling apparatus 2 generates the redundant data, and outputs a command to write the redundant data on the magnetic disk 7 to Fibre Channel 15.

Normally, the redundant data which are written on the magnetic disk 7 in the RAID configuration are generated by a controller in the driver 16. The controller also writes the data on the magnetic disks 8 and 9, and updates the redundant data.

However, in embodiment 3, when the lines are open, the transmission monitoring and controlling apparatus 2 generates the redundant data. The transmission monitoring and controlling apparatus 2 also generates a command to write the redundant data on the magnetic disk 7, and outputs the command to Fibre Channel 15.

Therefore, the driver 16 in the first system 1 does not generate the redundant data. Hence, a part of functions of the controller which is illustrated in FIG. 12 is provided in the processing controller 22.

When the first system executes a command to write data which are shown in FIG. 10 in the RAID configuration 14, the monitor 3a monitors information for writing and the processing controller 22 analyzes the information. Then, the processing controller 22 stores the data, the location information for writing the data and the redundant data updating information in the memory 5 or the magnetic disk 6.

As shown in FIG. 10, the first system 1 outputs a command to write the data at address 0 of the logical block address 100 in the magnetic disk 9 (a disk number #9), and the monitor 3a monitors the command to write. Then, the processing controller 22 analyzes the command, stores the information which is shown in FIG. 10 in the memory 5 or the magnetic disk 6 based on the analysis.

Besides, the redundant data which are stored in the magnetic disk 7 are not updated. Hence, the redundant data updating information is stored in the memory 5 or the magnetic disk 6 with a flag of "0."

When the first system 1 generates commands to write in the RAID configuration 14 sequentially as shown in FIG. 10, the monitor 3a monitors the commands. Then, the processing controller 22 analyzes the information, and stores the redundant data updating information and the location information for writing in the memory 5 or the magnetic disk 6 as shown in FIG. 10. When the processing controller 22 recognizes a vacancy in the lines in Fibre Channel 15, the processing controller 22 checks the redundant data updating information sequentially in the order in which it is stored in the memory 5 or the magnetic disk 6. When the redundant data are not updated, the processing controller 22 generates the redundant data and a command to write the redundant data on the magnetic disk 7. Then, the processing controller 22 outputs the generated command to Fibre Channel 15.

For example, the first row of FIG. 10 shows that data which are stored at address 0 of the logical block address 100 with the disk number #9 is not updated. In this case, the processing controller 22 retrieves data at address 0 of the logical block address 100 in the magnetic disk 9 from the disk number 9 (#9).

Further, the processing controller 22 retrieves data at address 0 of the logical block address 100 in the magnetic disk 8, and generates redundant data by using the formula which is shown in FIG. 12. Then, the processing controller 22 generates a command to write the generated redundant data at address 0 of the logical block address 100 in the magnetic disk 7, and outputs the generated command to Fibre Channel 15. The processing controller 22 turns the flag to "1", which indicates that the redundant date are updated.

When the redundant data are updated as stated, location information for writing with the flags of "1" is kept stored in the memory 5 or the magnetic disk 6. Since the capacity of the memory 5 and the magnetic disk 6 is limited, the processing controller 22 deletes updated redundant data from the memory 5 or the magnetic disk 6 with an adequate timing.

As stated, the location information for writing and the redundant data updating information which are shown in FIG. 10 are stored in the memory 5 or the magnetic disk 6. However, the information for writing may be also stored in the magnetic disks 8 and 9.

Since the data are stored in the memory 5 or the magnetic disk 6, when the processing controller 22 generates redundant data, the processing controller 22 does not need to read data from the magnetic disk. Hence, the processing speed of generating the redundant data becomes faster.

For example, when data at address 0 of the logical block address 100 in the magnetic disk with the disk number 9 (#9) shown in FIG. 10 are stored, it is not necessary to read the data from the magnetic disk 9.

Even if the magnetic disk 9 with the disk number 9 (#9) has failed and it becomes impossible to read the data from the magnetic disk 9, the redundant data can be generated in spite of the failure, only if the data are stored together with the location information for writing in the memory 5 or the magnetic disk 6. Additionally, when the magnetic disk has recovered from the failure, it becomes possible to write the data back to the magnetic disk.

Embodiment 4

In embodiment 4, it is assumed that at least one of the magnetic disks in the RAID configuration 14 of the second system 13 is in a maintenance operation. When the first system 1 generates a command to write on the magnetic disk which is in the maintenance operation, the transmission monitoring and controlling apparatus operates as follows.

FIG. 13 shows a sample of the redundant data updating information and the location information for writing which are stored in the transmission monitoring and controlling apparatus in embodiment 4.

In FIG. 13, flags show if the redundant data have been updated or not. Flags of "0", indicate that the redundant data have not been updated, and flags of "1" indicate that the redundant data have been updated. Flags for writing data show if the data have been written on the magnetic disk or not. In the flags for writing data, flags of "0" indicate that the data have been written on the magnetic disk, and flags of "1"

indicate that the data have not been written on the magnetic disk. Besides, data and location information for writing the data are shown in FIG. 13. The location information for writing the data includes a disk number which indicates a magnetic disk, a logical block address, and an address for storing the data which indicate a location for writing the data.

Figure 14:
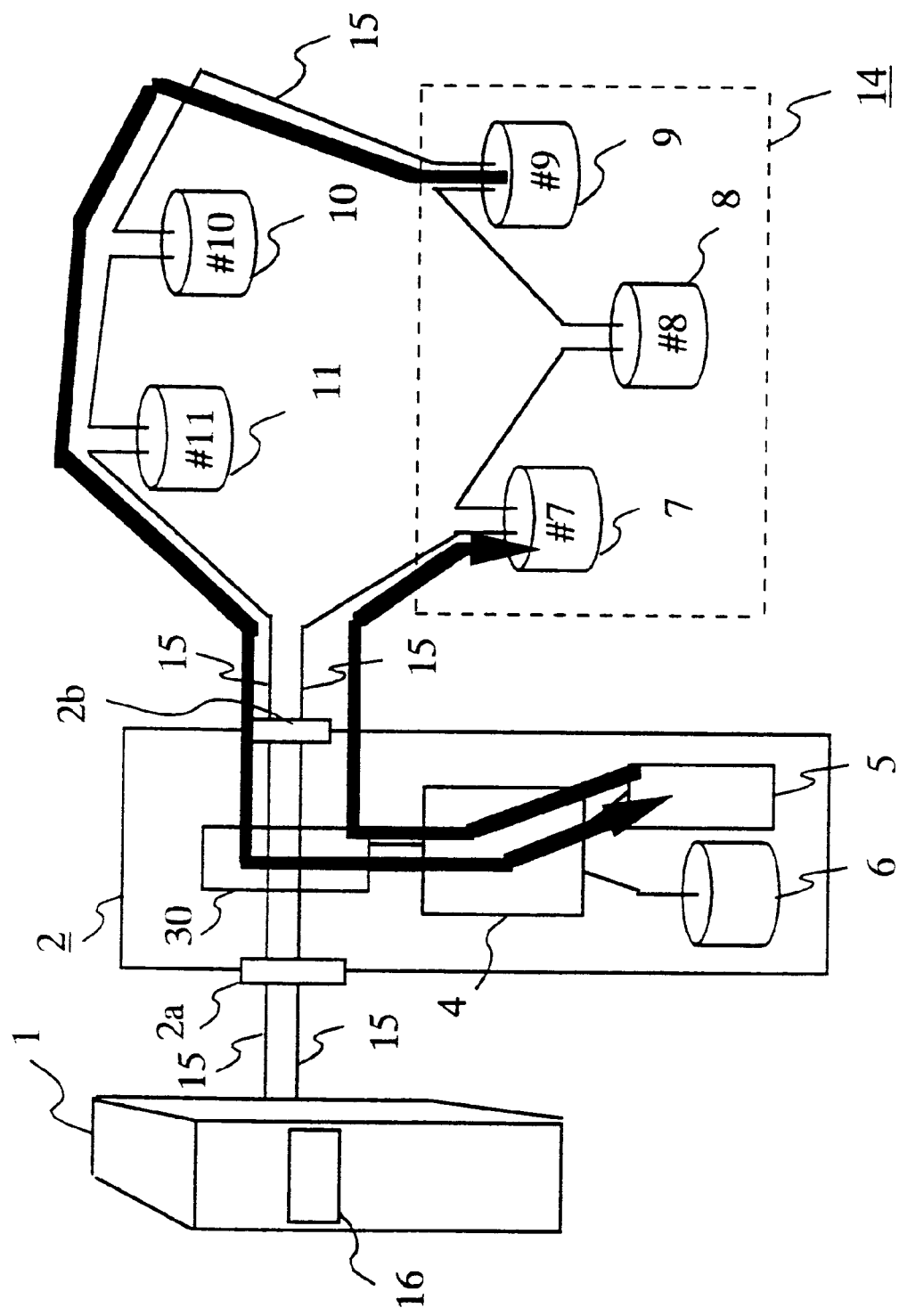
FIG. 14 illustrates an operation of the transmission monitoring and controlling apparatus of embodiment 4.

FIG. 14 illustrates an operation of the transmission monitoring and controlling apparatus of embodiment 4.

The monitor • switch 30 in FIG. 14 differs from the monitor • switch 30 in FIG. 1 in its configuration. When the monitor • switch 30 in FIG. 14 receives information from the first system 1 or the second system 13, the monitor • switch 30 stores the received information without outputting the information to Fibre Channel 15. At the same time, the monitor • switch 30 sends the information to the processing controller 22. The processing controller 22 analyzes the information, and generates a command for the first system 1 or the second system 13 based on the analysis. Or, the processing controller 22 instructs the switch 3b or 3d to output the information which is stored by the monitor • switch 30 to Fibre Channel 15 thoroughly. The switches 3b and 3d switch the information which is stored by the monitor • switch 30 and the command which is generated by the processing controller 22 in response to an instruction from the processing controller 22, so that one of them is outputted to Fibre Channel 15.

The monitor • switch 30 in embodiment 4 operates as stated.

Therefore, when the first system 1 sends a command to write data on the magnetic disk 9, the monitor • switch 30 stores the command to write the data, and sends the command to the processing controller 22. When the processing controller 22 has recognized that the magnetic disk 8 is in a maintenance operation, the processing controller 22 stores the data to be written on the magnetic disk 9 in the memory 5 or the magnetic disk 6 instead. The processing controller 22 generates a response for the first system 1 as if the data are written on the magnetic disk 9, and sends the response to the monitor • switch 30. The monitor • switch 30 switches so that the response from the processing controller 22 is outputted to Fibre Channel 15 with priority. The command to write stored in the monitor • switch 30 is discarded. If the magnetic disk 8 is not in a maintenance operation and is in normal operation, the processing controller 22 instructs output of the command to write stored in the monitor • switch 30. Therefore, the command to write stored in the monitor • switch 30 is outputted to Fibre Channel 15.

In FIG. 14, other reference numbers besides the monitor • switch 30 are same as in FIG. 1. Therefore, explanations are omitted. Hereinafter, assume that the RAID level of the RAID configuration 14 in FIG. 14 is 4. The magnetic disk 7 is used to store the redundant data. The magnetic disk 8 is assumed to be in a maintenance operation. Therefore, when the first system 1 attempts to execute a command to write, the transmission monitoring and controlling apparatus 2 monitors the command to write on the magnetic disk using the monitor 3a. The processing controller 22 recognizes the monitored command to write, and stores the data to be written on the magnetic disk 8 in the memory 5 or the magnetic disk 6. At this time, location information for writing and redundant data updating information which are shown in FIG. 13 are also stored.

The magnetic disk 9 is assumed to operate normally. The transmission monitoring and controlling apparatus 2 recognizes the command to write on the magnetic disk 9 which is sent from the first system 1, and the transmission monitoring and controlling apparatus 2 stores the data to be written on the magnetic disk 9 redundantly in the memory 5 or the magnetic disk 6.

Figure 15:
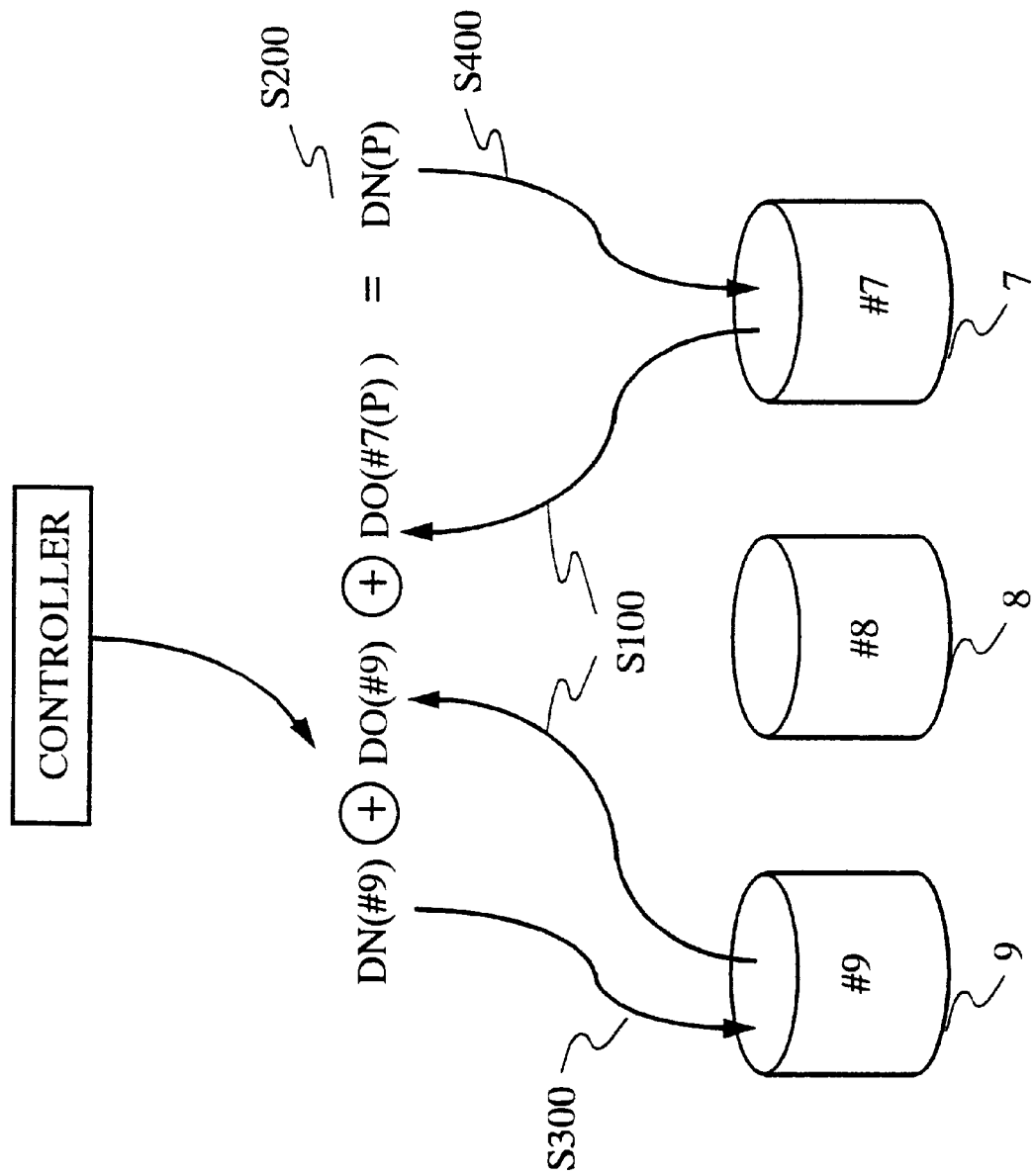
FIG. 15 shows a method of generating the redundant data of embodiment 4.

FIG. 15 is an explanatory chart of a method of generating the redundant data for embodiment 4.

As stated earlier, the redundant data to be written on the magnetic disk 7 in the RAID configuration are generated by the controller in the driver 16. The controller writes the date on the magnetic disks 8 and 9, and updates the redundant data.

However, in embodiment 4, when the lines are open, the transmission monitoring and controlling apparatus 2 generates the redundant data. The transmission monitoring and controlling apparatus 2 generates a command to write the redundant data on the magnetic disk 7, and outputs the command to Fibre Channel 15. Hence, the driver 16 in the first system 1 does not generate the redundant data. In embodiment 4, a part of the function of the controller is provided in the processing controller 22.

In embodiment 4, since the magnetic disk 8 is in a maintenance operation, the first system 1 is unable to write the data on the magnetic disk 8 or to read the data from the magnetic disk 8. Therefore, the data which are stored in the magnetic disk 8 are obtained from an exclusive OR operation of unupdated data DO (#9) which are stored in the magnetic disk 9 and redundant data DO (#7 (P)) which are stored in the magnetic disk 7 (step S100). Then, new redundant data DN (P) are obtained from an exclusive OR operation of the data which are obtained in step S100 and the new data DN (#9) which are in the magnetic disk 9 (step S200). The new data DN (#9) of the magnetic disk 9 are data which will be stored in the magnetic disk 9 (step S300). Further, the processing controller 22 generates a command to store the redundant data DN (P) in the magnetic disk 7 (step S400).

In FIG. 14, an operation of the transmission monitoring and controlling apparatus 2 is explained by using the information which is shown in FIG. 13.

The first system 1 outputs a command to write to the magnetic disk 8 without recognizing that the magnetic disk 8 is in the maintenance operation. Then, an error report is sent from the magnetic disk 8 to the first system 1. Therefore, the first system 1 excludes the magnetic disk 8 from the RAID configuration 14. These operations are monitored by the monitors 3a and 3c, and recognized by the processing controller 22.

The processing controller 22 sends a response to the command, which is outputted from the first system to the magnetic disk 8, to the first system 1 for the magnetic disk 8. When the command is a command to write data, the processing controller 22 stores the data, the location information to write the data and the redundant updating information in the memory 5 or the magnetic disk 6.

The processing controller 22 updates the redundant data in a procedure which is shown in FIG. 15. As stated, in step S100 of FIG. 15, the data in the magnetic disk 8 are obtained from the exclusive OR operation of the unupdated data (DO (#9)) in the magnetic disk 9 and the unupdated redundant data (DO (#7 (P))).

In embodiment 4, when the first system 1 has data to write on the magnetic disk 9, and the magnetic disk 8 has failed, the transmission monitoring and controlling apparatus 2 stores the data in the memory 5 or the magnetic disk 6 in order to regenerate the data in the magnetic disk 8. The data are written on the magnetic disk 9 at the time of updating the redundant data or after updating the redundant data.

For example, the transmission monitoring and controlling apparatus 2 recognizes that the magnetic disk 8 is in the maintenance operation, and the first system 1 outputs a command to write data on the magnetic disk 9 with the disk number 9 (#9). As shown in the first row in FIG. 13, a location for writing the data is address 0 of the logical block address 100 and data "1A" are data to be written on the magnetic disk 9. The processing controller 22 recognizes the command to write on the magnetic disk 9, the processing controller 22 stores the information which is shown in the first row in FIG. 13 in the memory 5 or the magnetic disk 6. At this time, the redundant data are not updated. Therefore, the flag is "0." Further, the data are not written on the magnetic disk 9, and the flag for writing data is "0."

In another case which is shown in the second row of FIG. 13, the first system outputs a command to write data on the magnetic disk 8 with a disk number 8 (#8), and the location for writing the data is address 3 of a logical block address 105. "2A" are data to be written on the magnetic disk 8. The processing controller 22 recognizes the command for writing on the magnetic disk 8, and stores the information which is shown in the second row of FIG. 13 in the memory 5 or the magnetic disk 6. Since the magnetic disk 8 is in the maintenance operation, the data cannot be written on the magnetic disk 8. Therefore, "0" is stored in the flag for writing data. Since the redundant data are not updated, the flag is "0."

Accordingly, the processing controller 22 stores information which are shown in the third and fourth rows of FIG. 13 in the memory 5 or the magnetic disk 6.

While storing the data, the processing controller 22 continues to check the vacancy of the lines in Fibre Channel 15 at predetermined constant intervals. When there is a vacancy in the lines, information is retrieved from the memory 5 or the magnetic disk 6 sequentially in an order of FIG. 13, and redundant data for data with flags of "0" are generated.

The redundant data are generated as illustrated in FIG. 15. The processing controller 22 checks information which are stored in the memory 5 or the magnetic disk 6 from the first row, and generates redundant data for data with the flags of "0."

For example, since the data in the first row in FIG. 13 have a flag of "0", the processing controller 22 generates redundant data for that data. The processing controller 22 reads data at address 0 of the logical block address 100 in the magnetic disk 9 with the disk number of 9 (#9). The data are D0 (#9) in FIG. 15.

The processing controller 22 also retrieves redundant data at address 0 of the logical block address 100 in the magnetic disk 7 with the disk number of 7 (#7). The data are D0 (#7 (P)) in FIG. 15.

Then, an exclusive OR operation of D0 (#9) and D0 (#7 (P)) is obtained. Further, an exclusive OR operation of this result and data "1A" (DN (#9)) is obtained, which is DN (P) in FIG. 15.

The processing controller 22 generates a command to write the DN (P) at address 0 of the logical block address 100 in the magnetic disk 7, and outputs the generated command to Fibre Channel 15. At the same time, the processing controller 22 turns the flag to "1." If the first system 1 is not accessing the magnetic disk 9 at this time, the processing controller 22 generates a command to write the data "1A" at address 0 of the logical block address 100, and outputs the generated command to Fibre Channel 15. At the same time, the flag to write the data is turned to "1."

When there is a vacancy in the lines, the processing controller 22 generates redundant data for the data in the second row of FIG. 13 which are stored in the memory 5 or the magnetic disk 6. Then, the processing controller 22 generates a command to write the generated redundant data on the magnetic disk 7, and outputs the command to Fibre Channel 15. In the second row of FIG. 13, information to be written on the magnetic disk 8 is stored. Therefore, the redundant data can be obtained from an exclusive OR operation of the data "2A' in the second row of FIG. 13 and data at address 3 of the logical block address 105 in the magnetic disk 9.

The processing controller 22 generates a command to write the obtained redundant data at address 3 of the logical block address 105 in the magnetic disk 7, and outputs the command to Fibre Channel 15. At this time, the flag is changed to "1."

However, since the magnetic disk 8 is in the maintenance operation, the data cannot be written on the magnetic disk 8. Therefore, when the transmission monitoring and controlling apparatus 2 recognizes that the maintenance operation of the magnetic disk 8 is completed and there is a vacancy in the lines of Fibre Channel 15, the transmission monitoring and controlling apparatus 2 writes the data which are stored in the memory 5 or the magnetic disk 6 on the magnetic disk 8.

For example, when the flag to write the data is "0" as shown in FIG. 13, the processing controller 22 generates a command to write the data on the magnetic disk 8, and outputs the generated command to Fibre Channel 15. At this time, the flag for writing the data is turned to "1."

The processing controller 22 may delete information with both the flag and the flag for writing the data of "1" to avoid over-flow of the memory 5 and the magnetic disk 6.

When the first system 1 outputs a command to read the data from the magnetic disk 8 during the maintenance operation of the magnetic disk 8, the monitor 3a monitors the command. The processing controller 22 analyzes the monitored command, and recognizes the command to read. The processing controller 22 obtains the data in reference to the information stored in the memory 5 or the magnetic disk 6 as shown in FIG. 13 based on the disk number and the address. Then, the processing controller 22 changes a transmission origin port ID of the data to an ID of the magnetic disk 8 as if the data were read from the magnetic disk 8, and sends a response to Fibre Channel 15.

Since the processing controller 22 recognizes that the magnetic disk 8 is in the maintenance operation, when the first system 1 outputs a command to read from the magnetic disk 9, the processing controller 22 also reads out the data by searching in the memory 5 or the magnetic disk 6 with reference to the disk number and the address. When the address is found in the memory 5 or the magnetic disk 6, the processing controller 22 obtains the data with reference to the information stored in the memory 5 or the magnetic disk 6. Then, the processing controller 22 sends a response to Fibre Channel 15.

When the address is not found in the memory 5 or the magnetic disk 6, the transmission monitoring and controlling apparatus 2 does not operate. In this case, the data are read from the magnetic disk 9 because the transmission monitoring and controlling apparatus 2 does not operate. The data which are read out from the magnetic disk 9 are outputted to Fibre Channel 15, and sent back to the first system 1.

When writing of the data on the magnetic disk 9 is not completed, new data are stored in the memory 5 or the magnetic disk 6, and old data are stored in the magnetic disk 9. Therefore, some measures have to be taken to prevent both data to be sent back to the first system.

For example, when the processing controller 22 obtains the data from the memory 5 or the magnetic disk 6, the processing controller 22 sends a response to the first system 1. At this time, the processing controller 22 changes the transmission origin port ID to a port ID of the magnetic disk 9. Since the first system 1 has received the response, even if the first system 1 receives a response from the magnetic disk 9, the first system 1 ignores a response from the magnetic disk 9.

As stated, even if the magnetic disk connected to Fibre Channel is in the maintenance operation, the first system is able to output a command to write without recognizing the maintenance operation. The transmission monitoring and controlling apparatus stores data for the magnetic disk which is in the maintenance operation. After the maintenance operation, the transmission monitoring and controlling apparatus generates a command to write the stored data back on the magnetic disk which was in the maintenance operation, and outputs the command to the network.

Embodiment 5

In embodiment 5, an operation of the transmission monitoring and controlling apparatus when the magnetic disk 8 is in failure in a network system that is same as the network system of embodiment 4 is explained.

Figure 16:
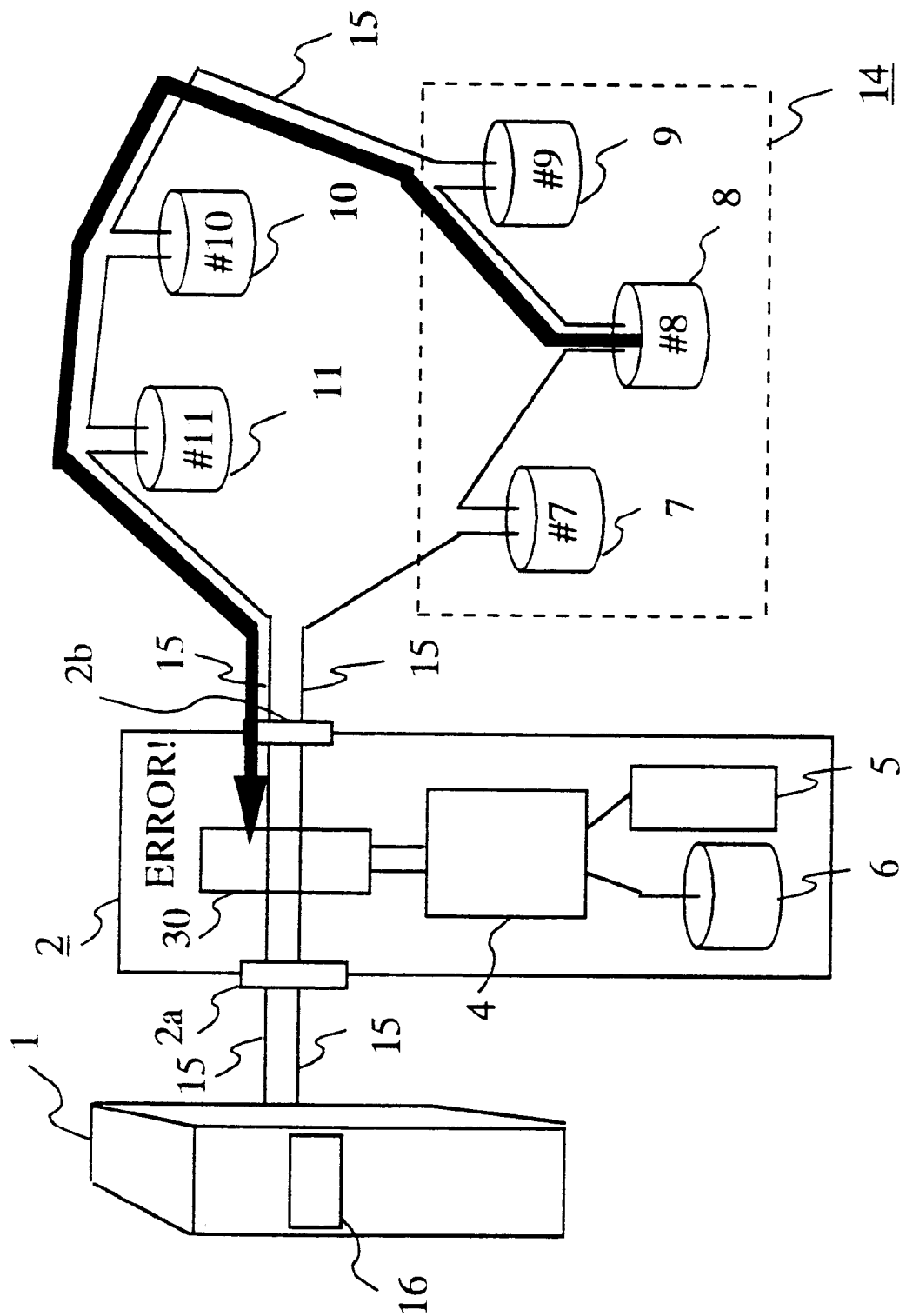
FIG. 16 illustrates an operation of the transmission monitoring and controlling apparatus of embodiment 5.
Figure 17:
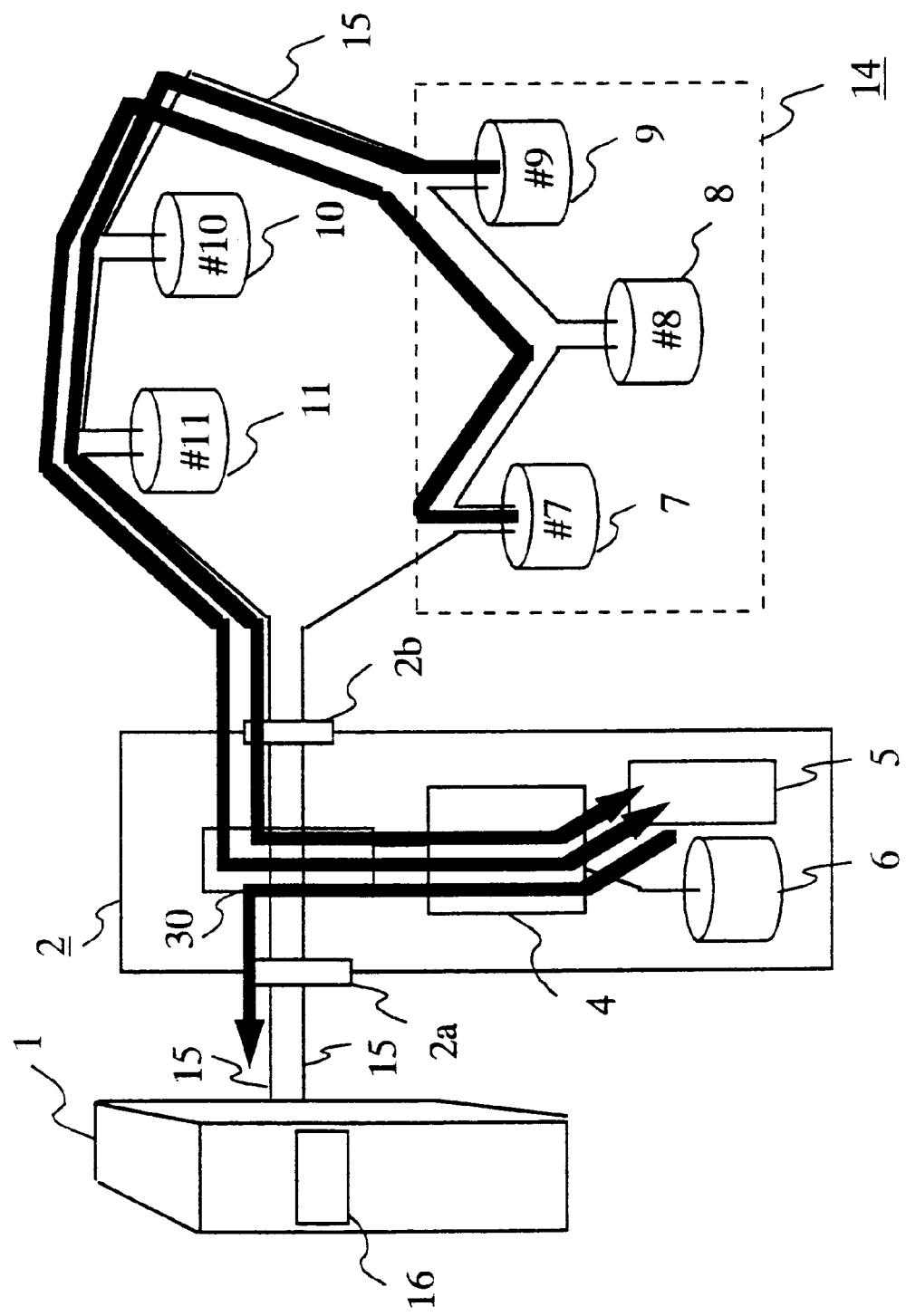
FIG. 17 illustrates an operation of the transmission monitoring and controlling apparatus of embodiment 5.
Figure 18:
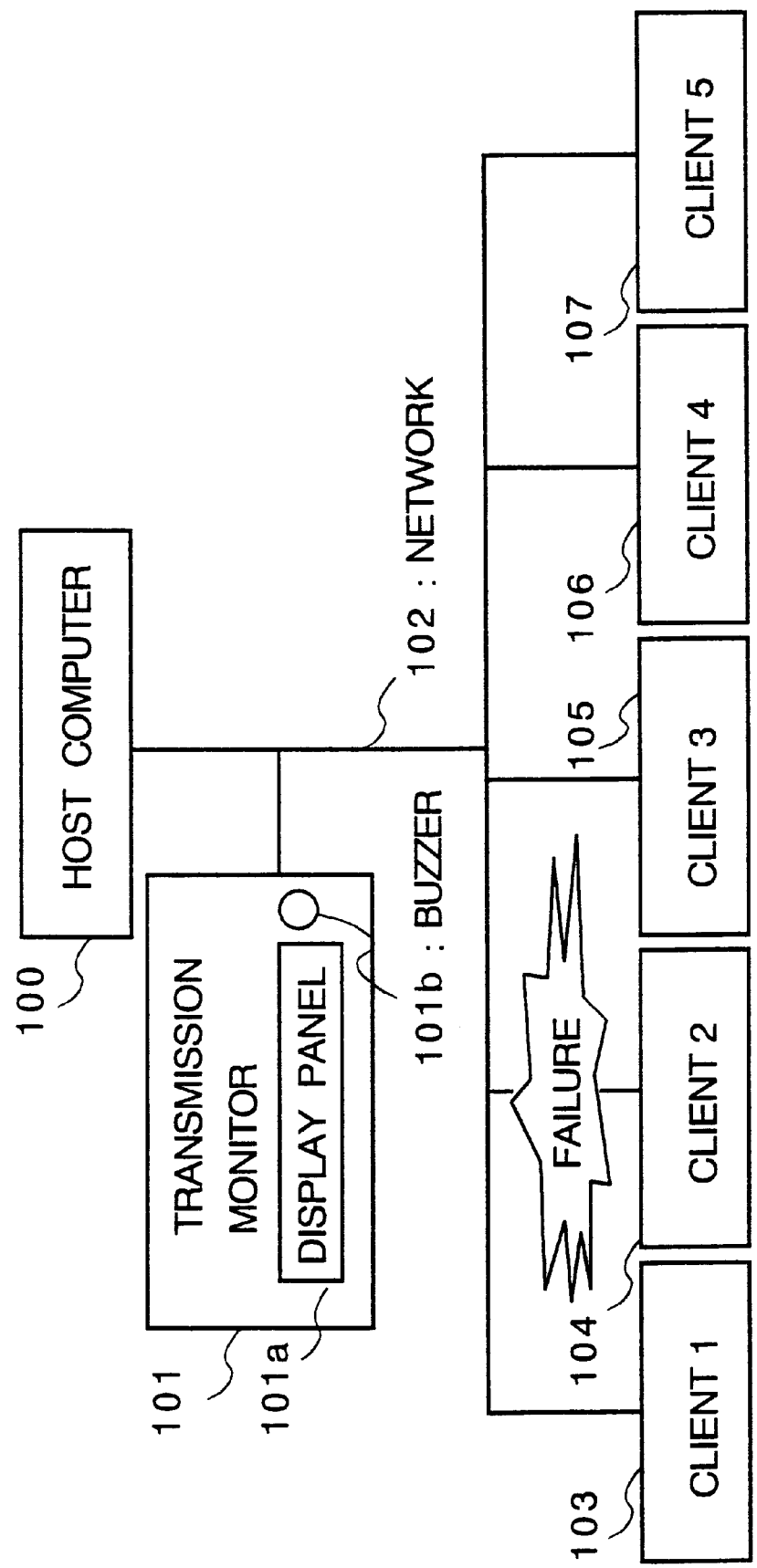
FIG. 18 is a configuration chart of a transmission monitor according to the related art.

FIGS. 16 and 17 are explanatory charts of the operation of the transmission monitoring and controlling apparatus in embodiment 5.

In FIGS. 16 and 17, the RAID configuration 14 has a level of 5. The location information for writing, redundant data updating information, etc. is stored in the memory 5.

For example, when the first system executes a command to read data from the magnetic disk 8. a failure may have occurred in the magnetic disk 8. Then, the magnetic disk 8 sends an error report to the first system 1. The monitor 3c monitors the error report which is outputted by the magnetic disk 8, and the processing controller 22 recognizes that the magnetic disk 8 has failed. At the same time, the first system 1 receives the error report from the magnetic disk 8, and instructs exclusion of the magnetic disk 8 from the RAID configuration 14. The transmission monitoring and controlling apparatus 2 recognizes the situation, and sends responses for a command to read and a command to write which are sent by the first system 1. Since the first system 1 recognizes the responses as the responses from the magnetic disk 8, the first system 1 does not perform a retry to the magnetic disk 8.

Practically, the transmission monitoring and controlling apparatus 2 changes its port ID to the port ID of the magnetic disk 8. Hence, packets which are outputted by the transmission monitoring and controlling apparatus 2 have the port ID of the magnetic disk 8. Since the RAID level is assumed to be 5 in embodiment 5, redundant data for the data to be read from the magnetic disk 8 are stored in magnetic disk 7 or 9. Therefore, the processing controller 22 monitors the error report from the magnetic disk 8, and generates data which the first system 1 tries to read from the magnetic disk 8 by using data from magnetic disks 7 and 9. Then, the processing controller 22 outputs the generated data to Fibre Channel 15. At this time, the ID of the magnetic disk 8 is set as the transmission origin port ID of the packet. Hence, when the first system 1 receives the packet, the first system 1 is able to obtain the data as if the data were read from the magnetic disk 8.

The processing controller 22 also stores the regenerated data which are same as the data in the magnetic disk 8 in the memory 5 together with the location information for writing the data.

Further, a spare disk, e.g., magnetic disk 11, which is connected to Fibre Channel 15 is able to be used for the magnetic disk 8. When lines are open in Fibre Channel 15, the transmission monitoring and controlling apparatus 2 generates a command to write the data of the magnetic disk 8 which are stored in the memory 5 on the magnetic disk 11. Then, the transmission monitoring and controlling apparatus 2 is able to operate the magnetic disk 11 for the magnetic disk 8. In that case, the transmission monitoring and controlling apparatus 2 changes the ID of the magnetic disk 11 to the ID of the magnetic disk 8, so that the magnetic disk 11 has the same address with the magnetic disk 8.

As stated, even if a failure has occurred in a magnetic disk connected to Fibre Channel, the transmission monitoring and controlling apparatus is able to regenerate data if the data are able to be generated from data in other magnetic disks. Further, the transmission monitoring and controlling apparatus is able to send a response to the first system as if the data are retrieved normally from the magnetic disk which has failed.

Besides, the spare disk which is connected to Fibre Channel is able to substitute for the magnetic disk which has failed.

Therefore, in the network system to which the transmission monitoring and controlling apparatus is connected, the system is able to be operated regardless of the failure of a certain magnetic disk.

In embodiments 1–5, the information to write, redundant data updating information, data, etc. are stored in the memory 5 or the magnetic disk 6. However, such data may be stored in the other magnetic disks 10 and 11 which are connected to Fibre Channel 15 instead of the memory 5 and the magnetic disk 6.

The transmission monitoring and controlling apparatus according to this invention monitors information in the network and controls the operations of the first system and the second system according to the information which is generated by the back controller based on the monitored information. Therefore, it is possible to realize a system which is controlled in accordance with the operations of the first system, the second system, and the network without operation by an operator. Besides, the transmission monitoring and controlling apparatus is able to be connected to the network without special processing. Therefore, the transmission monitoring and controlling apparatus is able to be connected to an existing network easily.

The transmission monitoring and controlling apparatus is able to store the information which is detected by the monitor in the controlling memory. Therefore, when the monitor detects a command of the first system to write data in the second system, the data are stored in the controlling memory. Accordingly, the data are able to be stored redundantly in the controlling memory and the second system.

When a failure occurs in the network which connects the second system and the transmission monitoring and controlling apparatus, the command from the first system does not reach the second system. However, if the command from the first system is stored in the controlling memory, when the network is recovered from the failure, the processing controller sends the command from the first system which is stored in the controlling memory to the second system. Then, the first system receives a response for the command. Accordingly, the reliability of a whole system is increased.

When the first system sends a command to write data to the data memory in the second system, the processing controller stores the data to be written on the second system in the controlling memory. The processing controller also stores the data in the data memory in the second system. Accordingly, the data are stored redundantly, and the reliability for storing data in the network system is increased.

The processing controller checks vacancy of the lines in the network. Therefore, when the second system includes the data memory and the operation to write is delayed as the commands to write are concentrated to the data memory, the controlling memory stores the data temporarily. Then, when the lines are open, the processing controller stores the data which are stored in the controlling memory in the data memory in the second system. Hence, line usage efficiency of the network is improved.

When the second system includes a RAID configuration and the processing controller recognizes a command from the first system to write data in the RAID, location information for writing the data in the RAID is stored in the controlling memory. Therefore, the processing controller is able to generate redundant data based on the location information for writing which is stored in the controlling memory. Then, the processing controller generates a command to update the generated redundant data, and outputs the command to the RAID. Accordingly, the redundant data are generated and updated, when the lines are open. Hence, overhead at the time of writing data in the RAID is reduced compared with the system according to the related art.

Besides, the controlling memory is able to store the redundant data updating information. When the lines in the network are open, redundant data of unupdated redundant data are generated with reference to the redundant data updating information, and the redundant data are able to be written in the RAID. Hence, the line usage efficiency of the network is improved.

When a failure has occurred in one of the plurality of the magnetic disks in the second system, the processing controller reads data from the magnetic disk which operates normally, and regenerates data which are stored in the magnetic disk which is in failure. Hence, the reliability of the system is increased.

The above-stated network is an optical LAN (Local Area Network) or Fibre Channel. Therefore, the transmission monitoring and controlling apparatus of this invention is easily provided in an existing system which includes an optical LAN or Fibre Channel network.

The converter is able to convert ten bit information which is transmitted through the Fibre Channel to eight bit information. Therefore, the transmission monitoring and controlling apparatus is able to process eight bit information. The transmission monitoring and controlling apparatus is able to operate normally when it is connected to Fibre Channel. For example, since eight bit information is transmitted in a SCSI (Small Computer System Interface), the transmission monitoring and controlling apparatus is able to operate on the SCSI without converting the bit length of the data.

The transmission monitoring and controlling method according to this invention includes a step of switching. Therefore, at least one of information which is transmitted in the network and information for controlling the operation of the first system or the second system which is generated in a step of generating the information is outputted to the network. Hence, the operations of the first system and the second system are controlled easily in accordance with the operation conditions of the first system and the second system.

The transmission monitoring and controlling method includes a step of checking the vacancy of the lines in the network. Therefore, when the lines in the network are open, a command for performing a certain operation is outputted to the first system or the second system. Hence, the line usage efficiency is improved.

The transmission monitoring and controlling method includes a step of updating the redundant data based on the location information for writing. Therefore, when the second system includes a RAID configuration and data are stored in the second system by the command from the first system, it is not necessary to update the redundant data. When the lines are open, the redundant data are updated. Hence, the line usage efficiency is improved.

According to the transmission monitoring and controlling method, the redundant data are generated based on the redundant data updating information. Therefore, when the lines are open, a command to write the generated redundant data in the RAID is outputted. Hence, the line usage efficiency is improved.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A transmission monitoring and controlling apparatus for monitoring and controlling a network connecting a first system and a second system, the apparatus comprising:

a first monitor for monitoring information, including data read commands and data write commands, transmitted from a first system to a second system through a network;

a second monitor for monitoring information, including device failure information, transmitted from the second system;

a controlling memory connected between the first and second systems in the network for maintaining a back-up copy of data stored in the second system;

a back controller for generating information to be sent to the first and second systems in response to information detected by the first and second monitors, the back controller comprising:

a processing controller for analyzing the information monitored by the first and second monitors, wherein, when the first system transmits a data read command to read data from a failed device in the second system, the processing controller retrieves a back-up copy from the controlling memory and transmits the back-up copy to the first system, thereby replacing the failed device; and first and second switches for receiving the information generated by the back controller and information transmitted by the first and second systems, for switching to output to the first and second systems one of the information transmitted and the information generated.

2. The transmission monitoring and controlling apparatus of claim 1, wherein the back controller comprises a first and second receiving controllers for receiving information transmitted in the network from the first and second monitors, the controlling memory stores the information received by the first and second receiving controllers, the processing controller analyzes the information received by the first and second receiving controllers and generates information sent to one of the first system and the second system in response to information stored in the controlling memory, and the transmission monitoring and controlling apparatus further comprises first and second transmitting controllers for outputting the information generated by the processing controller to the first and second switches.

3. The transmission monitoring and controlling apparatus of claim 2, wherein the processing controller retrieves information stored in the controlling memory and generates information for operating one of the first system and the second system based on the information retrieved from the controlling memory.

4. The transmission monitoring and controlling apparatus of claim 3, wherein at least one of the first system and the second system comprises a data memory for storing information, and the processing controller retrieves information stored in the controlling memory and generates a command for storing the information retrieved from the controlling memory in the data memory.

5. The transmission monitoring and controlling apparatus of claim 4, wherein the processing controller checks vacancy of lines of the network in response to the information transmitted in the network and monitored by the monitor, and, when there is a vacancy, the processing controller retrieves information stored in the controlling memory and generates the command.

6. The transmission monitoring and controlling apparatus of claim 4, wherein the data memory has a RAID (Redundant Array of Inexpensive Disks) configuration for storing redundant data.

7. The transmission monitoring and controlling apparatus of claim 6, wherein the processing controller stores, in the controlling memory, location information indicating a location for writing information in the data memory having the RAID configuration, and updates redundant data in response to the location information stored in the controlling memory when the location information is written in the data memory having RAID configuration.

8. The transmission monitoring and controlling apparatus of claim 6, wherein the processing controller stores, in the controlling memory, the information for writing and redundant data updating information indicating which redundant data updating has been completed when the information stored is information for writing in the data memory having the RAID configuration.

9. The transmission monitoring and controlling apparatus of claim 8, wherein the processing controller retrieves the redundant data updating information stored in the controlling memory, generates redundant data based on the redundant data updating information, and generates a command to store the redundant data generated by the processing controller, in the data memory having the RAID configuration, when the monitor monitors the information transmitted in the network, checks vacancy of the lines in the network and finds a vacancy.

10. The transmission monitoring and controlling apparatus of claim 6, wherein the data memory having the RAID configuration comprises a plurality of magnetic disks, and the processing controller accesses a normally operating magnetic disk of the data memory, obtains the redundant data for regenerating information, and transmits regenerated information to one of the first system and the second system, when a failure has occurred in at least one of the magnetic disks.

11. A transmission monitoring and controlling apparatus for monitoring and controlling a network connecting a first system and a second system, the apparatus comprising:

a monitor for monitoring information transmitted in a network;

a back controller for generating information sent to the network in response to information detected by the monitor; and a switch receiving the information generated by the back controller and information transmitted in the network, for switching to output to the network one of the information transmitted and the information generated, wherein:

the back controller comprises a receiving controller for receiving the information transmitted in the network from the monitor, the transmission monitoring and controlling apparatus further comprises a controlling memory for storing the information received by the receiving controller, and the back controller comprises a processing controller for analyzing the information received by the receiving controller and generates information sent to one of the first system and the second system in response to information stored in the controlling memory and a transmitting controller for outputting information generated by the processing controller to the switch, the processing controller retrieves information stored in the controlling memory and generates information for operating one of the first system and the second system based on the information retrieved from the controlling memory, at least one of the first system and the second system comprises a data memory for storing information, the processing controller generates a command for storing in the data memory information retrieved from the controlling memory, and the processing controller checks vacancy of lines of the network in response to the information transmitted in the network and monitored by the monitor and when there is a vacancy, the processing controller generates the command, and the controlling memory stores information stored in the data memory as redundant data.

12. The transmission monitoring and controlling apparatus of claim 1, wherein the network is an optical LAN (Local Area Network).

13. The transmission monitoring and controlling apparatus of claim 1, wherein the network is a Fibre Channel.

14. The transmission monitoring and controlling apparatus of claim 2, wherein the back controller comprises first and second converters for converting eight bit information to ten bit information and for converting ten bit information to eight bit information, the information transmitted in the network is ten bit information, and when the first and second converters receive ten bit information from the first and second receiving controllers, the first and second converters convert the ten bit information to eight bit information and send the information to the processing controller, and when the first and second converters receive eight bit information from the processing controller, the converters convert the eight bit information to ten bit information and send the ten bit information to the first and second transmission controllers.

15. A transmission monitoring and controlling method, wherein a network connecting a first system and a second system is monitored and controlled, the method comprising:

monitoring information, including data read commands and data write commands, transmitted from a first system to a second system through a network;

monitoring information, including device failure information, transmitted from the second system;

storing data in the second system;

maintaining a back-up copy of the data stored in the second system in a controlling memory connected to the first and second systems through the network;

receiving the information monitored, generating information based on the information received, and sending to the network the information generated based on the received information, wherein, when a data read command to read data from a failed device in the second system is received from the first system, retrieving a back-up copy from the controlling memory and transmitting the back-up copy to the first system, thereby replacing the failed device; and switching so that one of the information generated based on the received information generated and the information transmitted on the network is outputted to the network.

16. The transmission monitoring and controlling method of claim 15, comprising:

storing the information generated based on the received information; and retrieving the information stored in the storing step and operating one of the first system and the second system in response to the information retrieved.

17. The transmission monitoring and controlling method of claim 15, comprising checking vacancy of lines in the network based on the information transmitted in the network.

18. The transmission monitoring and controlling method of claim 15, wherein at least one of the first system and the second system comprises a memory having a RAID configuration for storing redundant data, the method comprising:

storing location information for writing including a location for writing information in the memory having the RAID configuration; and updating the redundant data based on the location information for writing.

19. The transmission monitoring and controlling method of claim 18, comprising:

storing redundant data updating information indicating which redundant data has been updated in the memory having the RAID configuration; and retrieving the redundant data updating information, generating redundant data based on the retrieved redundant data updating information, and generating a command to store the generated redundant data in the memory having the RAID configuration.

20. The transmission monitoring and controlling apparatus of claim 1 wherein the processing controller changes an origin port ID of the back-up copy retrieved from the controlling memory to an ID of the failed device.

21. The transmission monitoring and controlling method of claim 15 wherein transmitting the back-up copy retrieved from the controlling memory to the first system includes changing an origin port ID of the back-up copy to an ID of the failed device.

* * * * *